(12) United States Patent
Yoshimura et al.

(10) Patent No.: US 6,920,295 B2
(45) Date of Patent: Jul. 19, 2005

(54) IMAGE FORMING APPARATUS

(75) Inventors: Sohichi Yoshimura, Yamatokoriyama (JP); Hiroki Eto, Yamatokoriyama (JP); Kouichi Eto, Nara (JP); Michiyuki Suzuki, Nara (JP); Takashi Ide, Osaka (JP); Koji Tsukamoto, Yamatokoriyama (JP); Kenji Tani, Tenri (JP); Hirohito Morioka, Nara (JP); Kimiko Watanabe, Yamatokoriyama (JP); Kazuya Masuda, Nara (JP); Yoshinori Nakahira, Yamatokoriyama (JP); Masaaki Kawakami, Yamatokoriyama (JP); Takashi Sugitoh, Kashihara (JP); Yoshikazu Kondoh, Izumiotsu (JP); Mariko Arai, Kashihara (JP); Takahiro Kawakami, Ikoma (JP); Toshinori Tsujii, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 146 days.

(21) Appl. No.: 10/438,494

(22) Filed: May 14, 2003

(65) Prior Publication Data

US 2004/0013441 A1 Jan. 22, 2004

Related U.S. Application Data

(63) Continuation of application No. 09/908,325, filed on Jul. 17, 2001, now Pat. No. 6,603,937.

(30) Foreign Application Priority Data

Jul. 18, 2000 (JP) .................................... 2000-217803
Jul. 18, 2000 (JP) .................................... 2000-217804

(51) Int. Cl.[7] ............................................. G03G 15/00
(52) U.S. Cl. ....................................................... 399/81
(58) Field of Search ........................... 399/8, 9, 10, 11, 399/81, 107

(56) References Cited

U.S. PATENT DOCUMENTS

| | | | | |
|---|---|---|---|---|
| 4,597,662 A | * | 7/1986 | Hirata et al. .................. | 399/81 |
| 5,838,590 A | * | 11/1998 | Shimoyama et al. ....... | 702/130 |
| 6,037,921 A | * | 3/2000 | Matsumoto et al. .......... | 345/88 |

FOREIGN PATENT DOCUMENTS

| | | | |
|---|---|---|---|
| JP | 05-131727 | * | 5/1993 |
| JP | 05-313455 | * | 11/1993 |
| JP | 05-323905 | * | 12/1993 |
| JP | 06-110033 | * | 4/1994 |
| JP | 09-277669 | * | 10/1997 |
| JP | 11-275290 | * | 10/1999 |

* cited by examiner

Primary Examiner—Hoang Ngo
(74) Attorney, Agent, or Firm—Edwards & Angell, LLP; David G. Conlin; George W. Hartnell, III

(57) ABSTRACT

An object of the invention is to provide a display device of an image forming apparatus capable of displaying information that the user wants to obtain in a visually easy-to-recognize manner. In a compound image forming apparatus provided with: one of original reading means for reading image information from an original, image receiving means for receiving image information from a terminal connected to a network and a line image receiving means for receiving image information from a telephone line; image forming means for forming an image based on the image information obtained by the means; and a display portion for displaying the condition of the apparatus, a display condition control portion is provided that changes the display condition of the display portion to a visually easy-to-recognize condition when the condition of the compound image forming apparatus is changed.

43 Claims, 29 Drawing Sheets

FIG.11A

COPYING POSSIBLE

NUMBER OF COPIES: 0

MAGNIFICATION: 100%   ORIGINAL: A4

DENSITY: AUTO

COPYING POSSIBLE

NUMBER OF COPIES: 0

MAGNIFICATION: 100%   ORIGINAL: A4

DENSITY: AUTO

8(6) INVISIBLE

FIG.11C

COPYING POSSIBLE

NUMBER OF COPIES: 0

MAGNIFICATION: 100%   ORIGINAL: A4

DENSITY: AUTO

8(6) INVISIBLE

FIG.11D

INVISIBLE

NUMBER OF COPIES: 5

■ BASIC SCREEN
  COPYING
  · COPYING SCREEN

| COPYING POSSIBLE | |
|---|---|
| | 0 |
| MAGNIFICATION: 100% | ORIGINAL: A4 |
| DENSITY: AUTO | |
| SHEET: TRAY 1   A4 🗉 | |

— SETTING OF NUMBER OF COPIES

— SYMBOL REPRESENTATIVE OF PRESENCE OF SHEETS

FIG.14B

● FACSIMILE
  · INITIAL SCREEN

| INPUT NUMBER | |
|---|---|
| 10/31 MON 10:59PM | |
| MEMORY TRANSMISSION | 100% |
| DENSITY: AUTO | ORIGINAL: |
| IMAGE QUALITY: FINE · HALFTONE | |

FIG.14C

· FACSIMILE TRANSMISSION SCREEN

| TRANSMISSION POSSIBLE | |
|---|---|
| TEL: 0123-45-6789 | |
| MEMORY TRANSMISSION | 100% |
| DENSITY: AUTO | ORIGINAL: A4 |
| IMAGE QUALITY: FINE · HALFTONE | |

REMAINING MEMORY CAPACITY

ORIGINAL SIZE

FIG.14D

● SCANNER
  · E-MAIL INITIAL SCREEN

| SPECIFY DESTINATION | |
|---|---|
| [E-MAIL] | |
| DESTINATION: | |
| DENSITY: AUTO | ORIGINAL: |
| IMAGE QUALITY: 200dpi | |
| | PHOTOGRAPHY MODE |

FIG.14E

· E-MAIL TRANSMISSION SCREEN

| TRANSMISSION POSSIBLE | |
|---|---|
| [E-MAIL] | |
| DESTINATION: SHARP CORP. | |
| DENSITY: AUTO | ORIGINAL: A4 |
| IMAGE QUALITY: 200dpi | |
| | PHOTOGRAPHY MODE |

E-MAIL TRANSMISSION DESTINATION

FIG.14F

● PRINTER
  · INITIAL SCREEN

| PRINTING POSSIBLE |
|---|
| ON LINE |
| |

FIG.14G

· SCREEN DURING PRINTING

| PRINTING |
|---|
| ON LINE |
| SHEET: TRAY 1   A4🗉 |

TRAY USED, AND REMAINING CAPACITY

FIG.15A
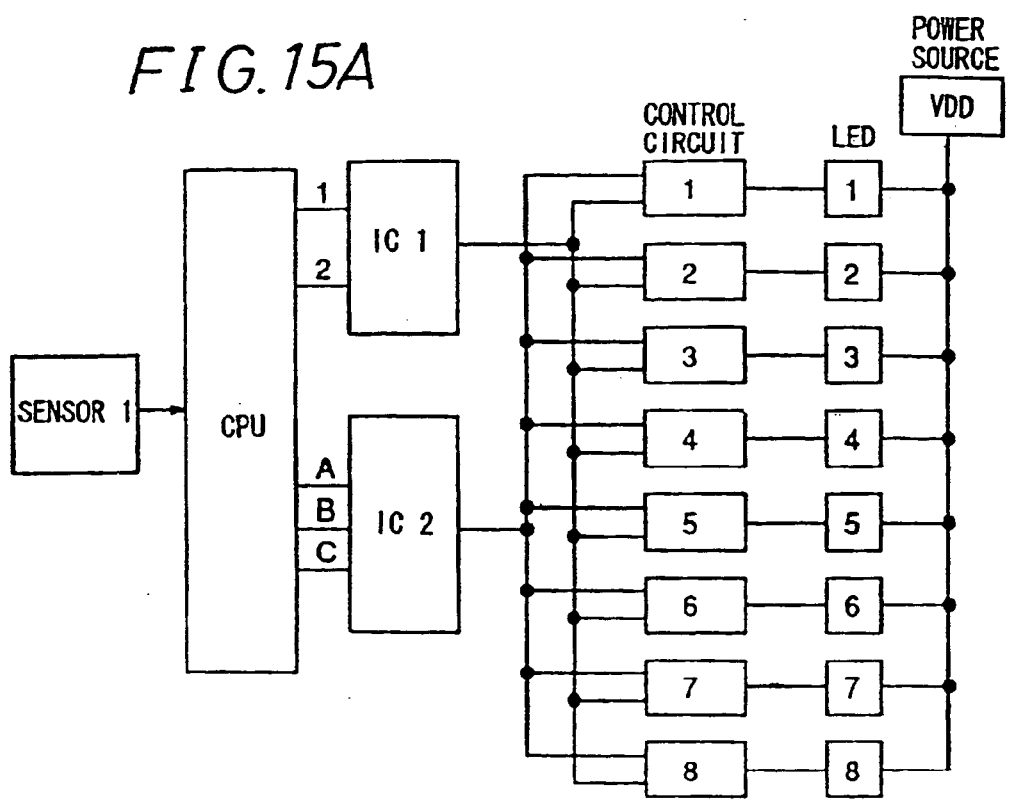
FIG.15B
CONTROL CIRCUIT DIAGRAM
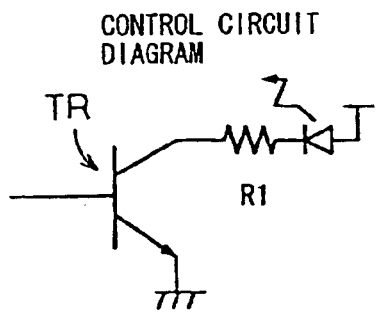
FIG.15C
| INPUT | | OUTPUT |
|---|---|---|
| 1 | 2 | X |
| 0 | 0 | 1 |
| 0 | 1 | 2 |
| 1 | 0 | 3 |
| 1 | 1 | 4 |
FIG.15D
| INPUT | | | OUTPUT |
|---|---|---|---|
| A | B | C | Y |
| 0 | 0 | 0 | ① |
| 0 | 0 | 1 | ② |
| 0 | 1 | 0 | ③ |
| 0 | 1 | 1 | ④ |
| 1 | 0 | 0 | ⑤ |
| 1 | 0 | 1 | ⑥ |
| 1 | 1 | 0 | ⑦ |
| 1 | 1 | 1 | ⑧ |

IMAGE FORMING APPARATUS

CROSS-REFERENCE TO RELATED APPLICATIONS

This application is a continuation of U.S. application Ser. No. 09/908,325 filed Jul. 17, 2001 now U.S. Pat. No. 6,603,937, the teachings of which are incorporated herein by reference, and, which, further, claims priority to Japanese patent application 2000-217803 filed Jul. 18, 2000 and Japanese patent application 2000-217804 filed Jul. 18, 2000, the teachings of which also are incoorporated herein by reference.

BACKGROUND OF THE INVENTION

1. Field of the Invention

The present invention relates to an image forming apparatus, such as a copier, having a display portion for displaying the working condition thereof, and more specifically, to an image forming apparatus in which the display portion visually changes in response to the change of the working condition of the apparatus.

2. Description of the Related Art

For various kinds of image forming apparatuses, various technical proposals have previously been made with an object of enhancing the operation efficiency of the apparatus and improving the operability and the viewability of the display panel that forms the heart of the man-machine interface with the user.

For example, Japanese Unexamined Patent Publication JP-A 11-275290 (1999) proposes an apparatus in which no error indicating means is required because an error indication for notifying the user of an occurrence of an error such as an image reading error is provided by changing the color of the light emitted by a reading light source of image reading means.

Japanese Unexamined Patent Publication JP-A 6-110033 (1994) discloses a technology with an object of improving the display brightness and resolution of the liquid crystal display by successively emitting lights of the three primary colors of a back light source and realizing multicolor display with one pixel.

Japanese Unexamined Patent Publication JP-A 5-323905 (1993) discloses a technology associated with a color conversion processing in which by providing a color converter that generates an I signal (white pixel signal) from an RGB signal, the characteristic of display means including an I pixel can be used with the conventional CRT signal as it is.

Many of the display panels of conventional image forming apparatuses are of formats displaying mainly characters such as characters necessary for the user to operate the apparatus and characters representative of the operation status of the apparatus. Such display panels displaying characters frequently use color liquid crystal because it is necessary to read the displayed characters.

For example, Japanese Unexamined Patent Publication JP-A 5-131727 (1993) makes a proposal with an object of, in a printer having the function of displaying the printing contents relating to a display device, improving the operability and the maintainability by providing color display without the use of an additional storage device and enabling not only the printing contents but also an error indication, a warning indication, a maintenance indication and the like to be displayed on the display device by changing the hue.

Japanese Unexamined Patent Publication JP-A 5-313455 (1993) describes a display device in which color filters capable of being freely inserted into and taken out of a gap between the liquid crystal display panel and the back light are provided as abnormality notifying means for notifying the user of an occurrence of an abnormality of the apparatus, and by superimposing on one another a plurality of such color filters having different hues, indications providing a warning and attracting the user's attention can be displayed on the same screen by an operation of the color filters.

However, in the cases of JP-A 5-131727 and JP-A 5-313455, merely the process or the condition of the copier (for example, the copier is on standby or printing, or a trouble occurs) is displayed in color, and the user cannot obtain detailed information necessary for the user such that in each process, what working condition the apparatus is in and which functions are usable at present.

Particularly, networked copiers that have been increasing in recent years have a problem (inferiority in usability) such that although the apparatus is operating, since the user is uncertain when to apply an interrupt, to use a desired function, the user must wait until the apparatus stops.

SUMMARY OF THE INVENTION

The invention is made in view of the above-mentioned circumstances, and an object thereof is to provide an image forming apparatus capable of displaying information that the user wants to obtain in a visually easy-to-recognize manner.

The invention provides an image forming apparatus comprising:

a display portion for displaying a condition of the apparatus; and a display condition control portion for changing, when the condition changes, a display condition of the display portion to a visually easy-to-recognize condition.

According to the invention, in response to the change of the condition (the change of the working condition and operation condition) of the apparatus (image forming apparatus), the display condition of the display portion, for example, the liquid crystal display condition, is changed to a visually easy-to-recognize condition (the hue, the color density, and the like are changed), so that the change of the working condition of the apparatus can be intuitively grasped easier than in the case where characters are displayed. Moreover, the structure of the display portion is simplified, which eliminates the need to secure a wider area in the display portion, thereby making the apparatus compact.

It is preferable that the invention is constructed as a compound image forming apparatus, the image forming apparatus comprising at least any one of:

original reading means for reading image information from an original;

image receiving means for receiving image information from a terminal connected to a network; and line image receiving means for receiving image information from a telephone line; and further comprising:

image forming means for printing the image information obtained from the respective means.

According to the invention, in a compound image forming apparatus connected to a network, particularly, interrupt and waiting timings can be grasped properly. This helps suppress occurrence of idle times, so that the usability improves.

In the invention, it is preferable that a visual change of the display condition corresponds to a change of back light emitted from a back light element provided in the display portion.

According to the invention, the change of the apparatus condition is indicated by the change of the back light in the liquid crystal display of the display portion. This eliminates the need for a complicated control circuit, so that the structure of the display portion is simplified, thereby achieving cost reduction.

In the invention, it is preferable that the back light element of the display portion for emitting back light is realized by a plurality of single color light emitting diodes of specific colors in combination or a color light emitting diode for emitting light of a plurality of colors, so that the display portion is capable of multiple color displays.

According to the invention, by realizing the back light element by using a plurality of single color LEDs of specific colors in combination or using a color LED, the display portion is capable of representing multiple colors. This eliminates the need for working on a new development, so that the manufacture is simplified, thereby achieving cost reduction.

In the invention, it is preferable that the back light element of the display portion for emitting back light is realized by a plurality of single color electroluminescent elements of specific colors in combination or a color electroluminescent element for emitting light of a plurality of colors, so that the display portion is capable of multiple color displays.

According to the invention, by realizing the back light element by using a plurality of single color EL elements of specific colors in combination or using a color EL element, the display portion is capable of representing multiple colors. This eliminates the need for working on a new development, so that the manufacture is simplified, thereby achieving cost reduction.

In the invention, it is preferable that characters to be displayed on the display portion are varied in accordance with information obtained by the change of the condition.

According to the invention, by using already-existing LEDs or EL elements, the display of the characters of the display portion are varied. This eliminates the need for working on a new development, so that the manufacture is simplified, thereby achieving cost reduction.

In the invention, it is preferable that a color of characters displayed on the display portion is changed to a different color with the change of back light color, and the different color is a complementary color of the color of the back light.

According to the invention, the characters displayed on the display portion are displayed in a color that varies with the change of the back light color, and the varying color is in a complementary color relationship with the color of the back light. By doing so, even if the back light color is changed, the displayed characters are easy to recognize, so that the viewability (visual sensitivity) of the display portion improves.

In the invention, it is preferable that, when a back light color is visually a bright color, the characters are displayed in black on the display portion.

According to the invention, when the back light color is visually a bright color, the characters displayed on the display portion are displayed in black, so that sufficiently high contrast can be obtained and the viewability (visual sensitivity) of the character improves.

In the invention, it is preferable that, when a back light color is visually a dark color, the characters are displayed as outline characters on the display portion.

According to the invention, when the back light color is visually a dark color, the characters displayed on the display portion are displayed as outline characters, so that sufficiently high contrast can be obtained and the viewability (visual sensitivity) of the character improves.

In the invention, it is preferable that the change of the back light corresponds to a change of a plurality of colors and the back light color of the display portion is varied in accordance with the change of the condition.

According to the invention, for example, by controlling the voltage applied to the electrodes of the liquid crystal cells constituting the liquid crystal display element in accordance with the change of the condition (the working condition, the operation condition, or others) of the apparatus, the color of the back light is selected by way of the liquid crystal display element. This eliminates the need for a complicated circuit structure, so that the manufacture is simplified, thereby achieving cost reduction.

In the invention, it is preferable that the characters displayed on the display portion are varied by controlling the voltage applied to the electrodes of the liquid crystal cells constituting the liquid crystal display element of the display portion in accordance with the change of the condition.

According to the invention, by controlling the voltage applied to the electrodes of the liquid crystal cells constituting the liquid crystal display element in accordance with the change of the condition of the apparatus, the characters displayed on the display portion are varied. This eliminates the need to fabricate a complicated circuit or the like, so that the manufacture is simplified, thereby achieving cost reduction.

In the invention, it is preferable that the change of the back light corresponds to a plurality of colors and the back light color of the display portion as well as characters to be displayed on the display portion are varied in accordance with the change of the condition.

According to the invention, for example, by controlling the voltage applied to the electrodes of the liquid crystal cells constituting the liquid crystal display device in accordance with the change of the condition of the apparatus, the selection of the back light color by way of the liquid crystal display element and the change of the characters displayed on the display portion are achieved concurrently, so that the viewability and the visual sensitivity of the liquid crystal display portion improve.

In the invention, it is preferable that the image forming apparatus has a plurality of processing modes, and back light of the display portion includes a reference color, and a processing mode selected from among the plurality of processing modes is indicated by the reference color.

According to the invention, by visually changing the liquid crystal display condition of the display device and simultaneously changing the display contents in response to the change of the condition of the apparatus, in contrast to the case where the change of the condition of the apparatus is displayed on the display portion with characters representing a new working condition, the display portion can be improved without a complicated configuration. Moreover, since it is not necessary to secure a wider area in the display portion, miniaturization and cost reduction can be achieved and the usability improves.

That is, the plurality of colors of the back light includes a reference color, and, in accordance with the reference color, the selected processing mode of the apparatus (the copier, printer, FAX, or scanner mode) is indicated. This makes it possible to recognize the processing mode of the apparatus without recognizing the characters displayed on the liquid display portion. Thus, the working condition (operation status) of the apparatus can be recognized in an instant, and the operation efficiency for interrupt or other operations is enhanced.

In the invention, it is preferable that a hue of the back light represents a processing status of the apparatus observed in the selected processing mode, and a change of the processing status is indicated by a change of the hue.

According to the invention, since the color of the back light varies from processing status to processing status in the processing mode of the apparatus, not only the processing mode of the apparatus but also the operation status observed in the processing mode can be recognized in an instant. This makes it possible to judge whether to perform an interrupt operation or to perform a waiting operation more properly, so that the usability improves and the rate of operation of the apparatus is increased.

In the invention, it is preferable that, when a trouble occurs, a hue of the back light remains the same regardless of the current processing mode and processing status.

According to the invention, when the apparatus suffers a trouble, the back light hue remains uniform regardless of the processing mode or processing status, so that occurrence of troubles is confirmed without fail and troubleshooting can be made swiftly. Moreover, the number of back light hues can be reduced, thereby making the structure simple. In addition, it is possible to cope with emergency with reliability.

In the invention, it is preferable that, when a trouble occurs, a hue of the back light is changed to a different hue in accordance with the current processing mode or processing status.

According to the invention, in preparation for occurrence of troubles, the hue of the back light varies to correspond to the processing mode or processing status. This makes it possible to immediately recognize the processing mode or processing status that led up to the trouble. Thus, the person who is responsible for the job which caused the trouble can restore the malfunctioning system to proper working condition on his/her own, so that it is unnecessary for all of the users who are performing a waiting operation in front of the apparatus to troubleshoot. In this way, unnecessary operations can be avoided, and, with the awareness of recurrence of similar troubles in a specific processing mode or processing status, effective measures can be taken against problems that might occur from then on. As a result, the rate of operation of the apparatus improves.

In the invention, it is preferable that, when a problem occurs, a color of the back light and displayed characters are changed in accordance with the contents of the trouble.

According to the invention, when the apparatus suffers a trouble, the back light color and displayed characters are varied in accordance with the contents of the trouble. By doing so, in accordance with the contents of the trouble, for example, paper jam, shortage of recording paper, running out of toner, or mechanism malfunction, user levels capable of countering these troubles can be confirmed. This helps save a plurality of users from having to troubleshoot, so that troubleshooting can be done properly and the rate of operation of the apparatus improves.

In the invention, it is preferable that, in response to the change of the condition of the apparatus, a plurality of display modes can be selectively applied to the display portion.

According to the invention, the change of the condition of the image forming apparatus can be switched by using a plurality of display modes in combination. This enables the user to recognize the condition of the apparatus in an instant, thereby eliminating the need for complicated operations and improving the operability.

In the invention, it is preferable that a plurality of display modes correspond to a variation of display form displayed on the display portion and a variation of display area.

According to the invention, the display form displayed on the display portion and the display area can be changed, so that only noteworthy information is obtained from the display portion displaying various apparatus conditions. Moreover, since various apparatus conditions can be displayed on the display portion as required (without performing complicated operations), the viewability (visual sensitivity) improves in the case where the display portion is frequently viewed, for example, during condition settings. Further, during the execution of the operation in each mode, other users are able to recognize the operating status in an instant, so that judgment on interrupt or waiting operations associated with the apparatus is facilitated with reliability.

In the invention, it is preferable that a plurality of display modes correspond to a variation of brightness of back light in the display portion.

According to the invention, the brightness of the back light of the display portion can be utilized in combination. This enables the user to find which information displayed on the display portion is noteworthy. Thus, even in cases where complicated function settings, such as condition settings, are performed, the operations are simple enough for first-time use by neophytes.

In the invention, it is preferable that a plurality of display modes correspond to a dynamic change of a hue of back light in the display portion.

According to the invention, the hue of the back light of the display portion can be dynamically changed. This makes it possible to notify the user of which information displayed on the display portion is noteworthy. Thus, even in cases where complicated function settings, such as condition settings, are performed, the operations are simple enough for first-time use by neophytes.

In the invention, it is preferable that a plurality of display modes are realized by a combination of variations of display form displayed on the display portion and display area, a variation of brightness of back light in the display portion, and a dynamic change of a hue of back light in the display portion.

According to the invention, in accordance with the user's instruction or the like, combination and selection (a wider choice of alternatives is offered in this case) of the various display and instruction modes of the display portion can be made, so that a display portion can be provided that satisfies the user's demands.

In the invention, it is preferable that a display region of back light of the display portion is divided into a plurality of portions on the display portion so that working conditions of individual constituent parts of the apparatus are separately displayed.

According to the invention, the region of the back light of the display portion is split into several portions, so that the working conditions of the individual units constituting the apparatus are checked in an instant, and settings of various display conditions can be made. Moreover, the display portion per se is built as a single unit, so that the manufacture is simplified, thereby achieving cost reduction.

In the invention, it is preferable that the image forming apparatus has a plurality of processing modes, and the display portion performs color display by back light based on a change of a processing mode of the image forming apparatus, and whether the image forming apparatus is under service conditions or not can be visually checked by a change of brightness of the back light.

According to the invention, in response to the change of the condition of the apparatus, the liquid crystal display condition of the display portion is visually changed and the display contents are varied. By doing so, in contrast to the case where characters are displayed, the structure of the display portion is simplified, and without the need for a wider space in the display portion, the apparatus can be made compact, thereby achieving cost reduction. Moreover, with the reliable display, higher usability can be obtained.

In the invention, it is preferable that the display condition control portion is provided with a plurality of background color light emitting circuits, and the brightness of the back light varies to correspond to the processing mode of the image forming apparatus in use.

According to the invention, the change of the brightness of the display portion is realized as the change of the back light. This eliminates the need for a complicated control circuit, thereby achieving cost reduction. By making the brightness change possible in that way, the condition change of the apparatus can be confirmed at a glance, so that the viewability (visual sensitivity) improves significantly.

In the invention, it is preferable that the change of the processing mode is indicated by changing the back light brightness in accordance with an input from an operation portion of the image forming apparatus or a printing request from individual terminals connected to the image forming apparatus.

According to the invention, the change of the processing mode can be realized by changing the brightness of the display portion in accordance with information derived from an input from the operation portion of the apparatus and a printing request from the individual terminals (a computer, FAX, or the like) connected to the apparatus. This eliminates the need for working on a new development, so that the system can be constructed only with the existing functions, thereby achieving cost reduction.

In the invention, it is preferable that, the compound image forming apparatus has a plurality of processing modes, and when the display portion is arranged according to a processing mode of the image forming apparatus, a hue of back light varies to correspond to the processing mode, and the hue of the back light also varies to correspond to a processing status.

According to the invention, in response to the change of the condition of the image forming apparatus, the liquid crystal display condition of the display portion arranged according to the processing mode is visually changed. By doing so, in contrast to the case where characters are displayed, the structure of the display portion is simplified, thereby achieving cost reduction. Moreover, the processing mode of the apparatus can be intuitively grasped without reading the characters displayed on the liquid crystal display portion, so that the viewability (visual sensitivity) improves significantly. Thus, the working condition (operation status) of the apparatus can be recognized in an instant, so that the usability improves significantly.

In the invention, it is preferable that, back light colors which are mutually largely different in Lab level are employed to easily identify respective processing modes by a difference among back light colors.

According to the invention, by using a largely different hue for each processing mode (the copier, printer, FAX, and scanner modes), it is possible to immediately identify which processing mode of the compound image forming apparatus is in an operable state, so that the usability improves significantly.

In the invention, it is preferable that back light color is varied within approximately the same kind of color Lab level in accordance with contents of processing.

According to the invention, the hue is varied within the same kind of color level in accordance with the contents of processing (the ready state, the standby state, the operating state, and the like) in the processing mode. By doing so, the processing mode of the apparatus can be recognized in an instant without reading the displayed characters. Accordingly, the processing mode can be easily identified with reliability regardless of the contents of processing.

In the invention, it is preferable that, in each processing mode, at the time when a trouble occurs or when a supply needs replacing, to provide a warning, back light color is made uniform regardless of the processing mode.

According to the invention, when the apparatus suffers a trouble, the back light hue is made uniform regardless of the processing mode or processing status, so that the trouble is detected without fail and troubleshooting can be made swiftly. Moreover, the number of hues of the back light can be reduced and thus the structure is simplified, thereby achieving cost reduction.

In the invention, it is preferable that, in each processing mode, during one processing mode is in operation, the back light element corresponding to the other processing mode is turned off.

According to the invention, during one processing mode is in operation, the back light element corresponding to the other processing mode is turned off, so that the mode in operation can be easily identified with reliability, and power consumption is reduced, thereby improving the energy saving effect.

In the invention, it is preferable that, in each processing mode, during one processing mode is in operation, a back light element with a hue representative of another reservable or interruptable processing mode is turned on.

According to the invention, the liquid crystal display condition is visually varied in accordance with the condition of a reservable or interruptable processing mode. By doing so, the working condition (operation status) of the apparatus can be grasped in an instant and the information on an operable processing mode can be obtained with reliability. As a result, unnecessary operations can be avoided, so that the rate of operation of the apparatus improves.

In the invention, it is preferable that the display condition of the display portion is visually varied and contents of display are changed in accordance with a progress of processing.

According to the invention, in response to the change of the condition of the image forming apparatus, the liquid crystal display condition of the display device is visually varied and the contents of display are changed. By doing so, in contrast to the case where characters are displayed, the structure of the display portion is simplified, and further, since it is unnecessary to secure a wider area in the display portion, the cost can be reduced. Moreover, the display condition can be confirmed from a distance, so that the viewability (visual sensitivity) improves significantly.

In the invention, it is preferable that a change of the display contents of the display portion is made by changing characters to be displayed on the display portion based on information obtained from the change of the condition of the image forming apparatus.

According to the invention, the change of the display contents of the display portion is made by changing the characters displayed on the display portion based on the information obtained by the change of the condition of the apparatus. This makes it possible to utilize the existing functions and thus reduce the cost.

In the invention, it is preferable that a color of characters to be displayed on the display portion is changed to a different color with the change of back light color, and the different color is a complementary color of the color of the back light.

According to the invention, the color of the characters displayed on the display portion. (liquid crystal) varies with the change of the back light color, and the varying color is in a complementary color relationship with the color of the back light. By doing so, even in a case where the hue of the back light is varied, the viewability of the displayed characters improves and higher usability can be attained.

In the invention, it is preferable that, when back light color is visually a bright color, characters are displayed in black on the display portion.

According to the invention, when the back light color is visually a bright color, the characters the display portion in the display portion are displayed in black, so that sufficiently high contrast can be obtained and the viewability (visual sensitivity) of the displayed character improves.

In the invention, it is preferable that, when back light color is visually a dark color, characters are displayed are displayed as outline characters on the display portion.

According to the invention, when the back light color is visually a dark color, the characters displayed on the display portion are displayed as outline characters, so that sufficiently high contrast can be obtained and the viewability (visual sensitivity) of the displayed character improves.

In the invention, it is preferable that a plurality of colors of back light of the display portion are selected by controlling a voltage applied to electrodes of liquid crystal cells constituting a liquid crystal display element of the display portion in accordance with a change of working status.

According to the invention, by controlling the voltage applied to the electrodes of the liquid crystal cells constituting the liquid crystal display element in accordance with the change of the condition of the apparatus, the color of the back light is selected by way of the liquid crystal display element. This eliminates the need to fabricate a complicated circuit or the like, thereby achieving cost reduction.

In the invention, it is preferable that the characters displayed on the display portion is varied by controlling a voltage applied to electrodes of liquid crystal cells constituting a liquid crystal display element of the display portion in accordance with a change of working status.

According to the invention, by controlling the voltage applied to the electrodes of the liquid crystal cells constituting the liquid crystal display element in accordance with the change of the condition of the apparatus, the characters displayed on the display portion is varied. This eliminates the need to fabricate a complicated circuit or the like, thereby achieving cost reduction.

In the invention, it is preferable that a plurality of colors of back light of the display portion are selected by controlling a voltage applied to electrodes of liquid crystal cells constituting a liquid crystal display element of the display portion in accordance with a change of working status, and the characters to be displayed on the display portion is varied by controlling the voltage applied to the electrodes of the liquid crystal cells constituting the liquid crystal display element of the display portion in accordance with the change of the working status.

According to the invention, by controlling the voltage applied to the electrodes of the liquid crystal cells constituting the liquid crystal display element in accordance with the change of the condition of the apparatus, the selection of the back light color by way of the liquid crystal display element and the change of the characters displayed on the display portion are achieved concurrently. This makes it possible to increase the variety of the contents of the liquid crystal display, to realize more suitable display, and to improve the usability.

In the invention, it is preferable that the plurality of colors of the back light includes a reference color, and, in accordance with the reference color, the progress of the processing in a selected processing mode is indicated by the back light.

According to the invention, the plurality of colors of the back light includes a reference color, and, in accordance with the reference color, the progress of the processing in the selected processing mode of the apparatus (the copier, printer, FAX, or scanner mode) is indicated, so that the progress of the processing of the apparatus can be recognized without confirming the characters displayed on the liquid crystal display portion. This makes it possible to recognize the change of the condition of the apparatus in an instant, and to make judgment as to whether or not an interrupt operation is possible and a grasp of a waiting time properly, so that the usability improves.

In the invention, it is preferable that the display portion is capable of displaying other information than inputting conditions for the apparatus in question.

According to the invention, the display portion is capable of displaying other information than inputting conditions for the apparatus (the current condition of progress of the processing, the list of the locations of trouble occurrences, the use condition of the consumables, the list of the charging systems, etc.) Therefore, not only it is possible to enable the user involved in the operation of the apparatus to recognize the condition of the apparatus, but it is also possible to, when the user in question left the place, enable the other user to recognize the condition of the apparatus with ease. Consequently, troubleshooting or an operable interrupt processing of the apparatus can be easily recognized, so that the rate of operation of the apparatus is increased.

In the invention, it is preferable that, when the image forming apparatus is out of service and is in the standby state with its power source turned on, the back light element is turned off.

According to the invention, when the apparatus is in the energy saving mode, by turning off the back light, the power consumed by the apparatus can be reduced, thereby improving the energy saving effect.

In the invention, it is preferable that, when the image forming apparatus is deactivated, or when no user is found around the apparatus, the back light element is turned off.

According to the invention, when the image forming apparatus is deactivated, or when no user is found around the apparatus, by turning off the back light, the power consumed by the apparatus can be reduced, thereby improving the energy saving effect.

In the invention, it is preferable that the back light element is turned on after the approach of users is detected by a reflection-type sensor arranged in an exterior portion of the image forming apparatus.

According to the invention, the display portion is turned on after the reflection-type sensor arranged in the exterior portion of the image forming apparatus detects the approach of users who intend to confirm the condition of the apparatus (specifically, to collect printing paper) or to use the apparatus (specifically, to make a request for printing in the copier mode or a request for transmission in the FAX mode), so that the usability improves.

In the invention, it is preferable that, the image forming apparatus has a FAX mode, and in the FAX mode, when a job for data reception is finished, the back light element is turned on to provide a warning that received data is present.

According to the invention, in the FAX mode, when the job for data reception is finished, the back light element is turned on to provide a warning that received data is present. This makes it possible to immediately recognize the job status with ease, so that the user convenience improves.

In the invention, it is preferable that, the image forming apparatus has a printer mode, and in the printer mode, when a job for a print request is finished, the back light element is turned on to provide notification that the job is completed.

According to the invention, in the printer mode, when the job for a print request is finished, the back light element is turned on to provide notification that the job is completed. This makes it possible to immediately recognize the job status with ease, so that the user convenience improves.

The invention further provides an image forming apparatus comprising:

a display panel for displaying a working condition and operation condition of the image forming apparatus;

a temperature setting requiring portion having a heat source, the portion requiring temperature setting;

a temperature detecting means disposed in the temperature setting requiring portion; and a display condition control portion for providing, based on a temperature detected by the temperature detecting means, notification of normality and abnormality of the temperature by changing a display condition of the display panel.

According to the invention, in accordance with the working condition (change) of the temperature setting requiring portion at that time, the display condition of the display panel, for example, the hue of the back light, is varied. By doing so, in contrast to the case where characters are displayed, the contents of the display can be intuitively grasped with ease, that is, the viewability (visual sensitivity) of the display contents improves significantly.

Moreover, the structure of the display portion can be made simpler than in the case where characters are displayed, and without the need to secure a wider area in the display portion, the simplification and miniaturization of the structure of the display portion can be achieved, thereby reducing the cost and improving the usability. Consequently, maintenance and inspection can be automatically performed in a proper manner without stopping the apparatus.

In the invention, it is preferable that the temperature setting requiring portion is fixing means, process means, or optical means.

According to the invention, the temperature of the temperature setting requiring portion that requires temperature setting (temperature condition) can be confirmed at a glance by the visual change of the display panel without leaving the apparatus open and touching the inner part of the apparatus, so that the user convenience and safety improve.

In the invention, it is preferable that the display condition control portion controls the display condition of the display panel such that a hue is varied to correspond to each temperature setting requiring portion, and that, as the temperature detected by the temperature detecting means disposed in the temperature setting requiring portion rises, the hue becomes denser within the same kind of color.

According to the invention, the temperature condition of the temperature setting requiring portion can be intuitively grasped from outside by the display condition of the display panel, for example, the hue of the back light and the density thereof, so that the life, durability, or the like of each temperature setting requiring portion can be separately grasped with reliability.

In the invention, it is preferable that the display condition control portion is capable of detecting a number of sheets having undergone printing in the image forming apparatus by changing a temperature display condition of the fixing means in the display panel.

According to the invention, in addition to the temperature condition of the fixing means during printing, the number of sheets having undergone printing at that time can be grasped, so that the usability and safety improve.

In the invention, it is preferable that., during warm-up processing started immediately after power is turned on, the display condition of the display panel is kept identical with a temperature display condition of the fixing means.

According to the invention, by displaying the temperature condition in the display panel until the apparatus enters the printing-ready state, the working condition of the apparatus can be grasped with reliability, so that the operation efficiency is enhanced.

In the invention, it is preferable that, when a temperature of the temperature setting requiring portion exceeds a predetermined temperature, the display condition control portion activates temperature cooling means disposed in the temperature setting requiring portion to adjust the temperature of the temperature setting requiring portion to an appropriate temperature (set temperature).

According to the invention, the temperature of each temperature setting requiring portion is adjusted to an appropriate temperature before an abnormality occurs in the temperature setting requiring portion, so that the apparatus can be maintained properly, the life thereof is prolonged, and the rate of operation is increased.

In the invention, it is preferable that, when a temperature of the temperature setting requiring portion falls below a predetermined temperature, the display condition control portion activates a temperature increasing means disposed in the temperature setting requiring portion to adjust the temperature of the temperature setting requiring portion to an appropriate temperature (set temperature).

According to the invention, the temperature of each temperature setting requiring portion is adjusted to an appropriate temperature before an abnormality occurs in the temperature setting requiring portion, so that the apparatus can be maintained properly, the life thereof is prolonged, and the rate of operation is increased.

In the invention, it is preferable that, when an abnormal temperature which deviates from the predetermined temperature is detected in the temperature setting requiring portion, the display condition control portion provides a warning of the abnormality in such a manner that, in the display panel, an abnormally high temperature and an abnormally low temperature are indicated by mutually different hues.

According to the invention, the abnormality of each temperature setting requiring portion can be properly grasped by the warning. Moreover, with the awareness of recurrence of similar troubles in a specific temperature setting requiring portion, effective measures can be taken against problems that might occur from then on.

It is preferable that the invention is constructed as a compound image forming apparatus, the image forming apparatus comprising at least any one of:

original reading means for reading image information from an original;

image receiving means for receiving image information from a terminal connected to a network; and line image receiving means for receiving image information from a telephone line; and further comprising:

image forming means for printing the image information obtained from the respective means.

According to the invention, in a compound image forming apparatus connected to a network, particularly, interrupt timings can be grasped properly, so that the user convenience and usability improve.

BRIEF DESCRIPTION OF THE DRAWINGS

Other and further objects, features, and advantages of the invention will be more explicit from the following detailed description taken with reference to the drawings wherein:

FIGS. 11A to 11D are plan views of a display portion in the third embodiment;

FIGS. 14A to 14G are plan views of the display portion in the third embodiment;

FIG. 15A is a block diagram of a light emitting portion of an image forming apparatus according to a fourth embodiment of the invention;

FIG. 15B is a circuit diagram of a control circuit in the fourth embodiment of the invention;

FIG. 15C is a table for selecting a brightness of a light emitting diode;

FIG. 15D is a table for selecting the light emitting diode;

DETAILED DESCRIPTION OF THE PREFERRED EMBODIMENTS

Figure 1:
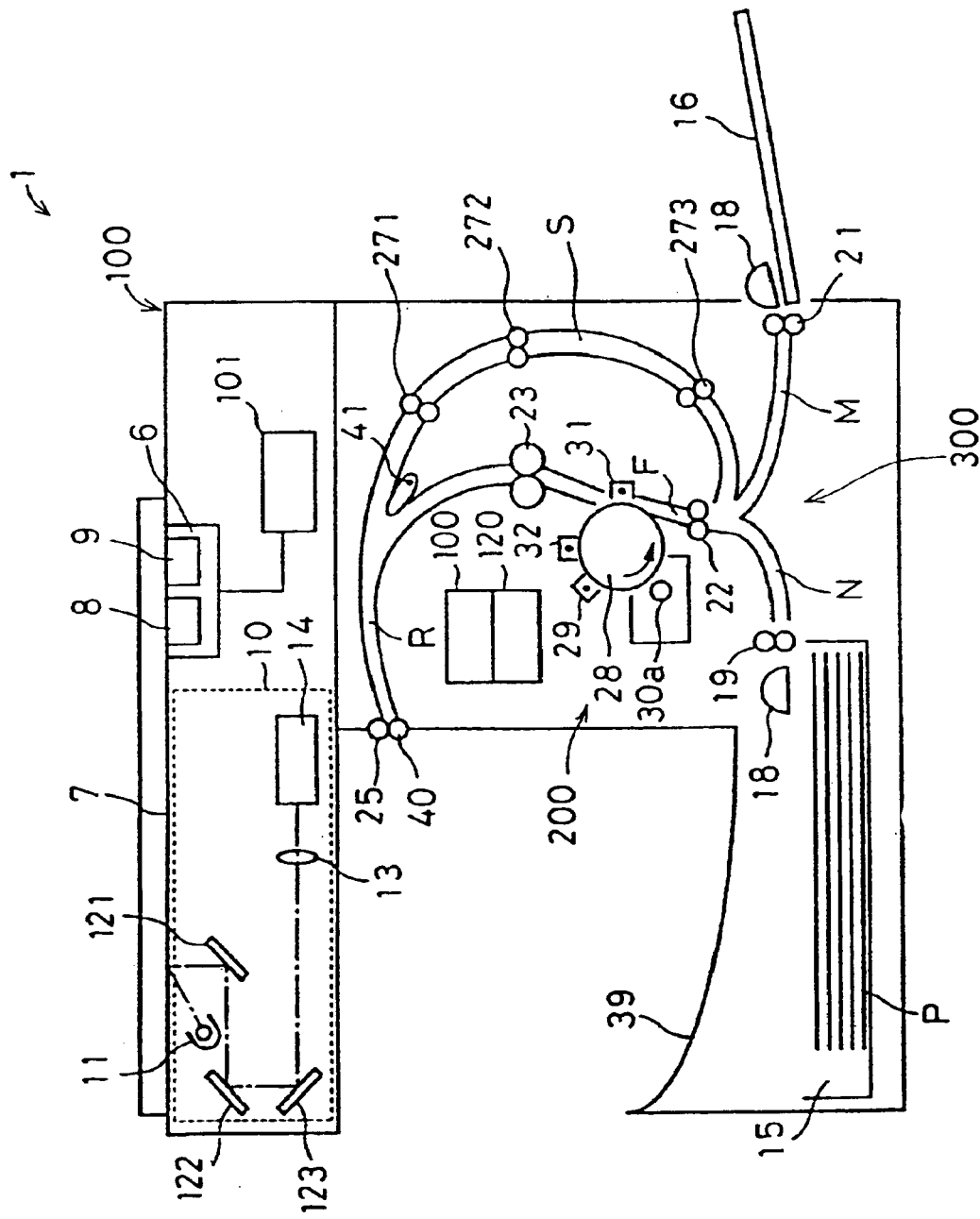
FIG. 1 is a view of the structure of an image forming apparatus according to a first embodiment of the invention.

Now referring to the drawings, preferred embodiments of the invention are described below.

An image forming apparatus according to a first embodiment of the invention will be described in detail with reference to FIGS. 1 to 5.

FIG. 1 shows the structure of a small-size digital copier (hereinafter, referred to as this compound apparatus). This compound apparatus 1 is substantially U-shaped, and comprises a scanner portion 100, an image forming portion 200, a sheet conveying portion 300 and a control portion (not shown) for controlling these portions. Although not shown, this compound apparatus is networked to various kinds of computers and facsimile transmitters-receivers through a local line.

First, the scanner portion 100 will be described. As shown in FIG. 1, the scanner portion 100 constituting original reading means has an original table 7 made of transparent glass or the like on the top surface thereof. Below the original table 7, a scanner optical system 10 constituting optical means is disposed. The scanner optical system 10 is provided with an exposure lamp 11, reflecting mirrors 121, 122 and 123, an imaging lens 13 and an CCD image sensor 14.

The exposure lamp 11 is a light source for scanning an original placed on the original table 7 with light. The reflecting mirrors 121, 122 and 123 direct the reflected light from the original to the imaging lens 13 and the CCD image sensor 14, for example, as shown by the dash and dotted line in the figure.

The CCD image sensor 14 receives the reflected light imaged by the imaging lens 13, and generates image data of an electric signal corresponding to the reflected light. The image data undergoes a predetermined image processing by the control portion, and then, is transmitted to a laser scanning unit described later.

While a method of reading information on an image in an original according to the stationary original exposure method has been described above, a scanner portion employing both the moving original exposure method and the stationary original exposure method may be used as the scanner portion 100 of the above-described copier.

In the vicinity of the original table 7, an operation panel 6 is provided that has a liquid crystal display portion (display portion) (hereinafter, referred to as LCD display portion) 8 for notifying the user of the condition of the apparatus and the like and an operation key portion 9 providing a man-machine interface with the user. The LCD display portion 8 comprises a liquid crystal display element for liquid crystal display and a light emitting portion for irradiating the back light from a side opposite to a display side of the liquid crystal display element. The technical contents relating to the LCD display portion 8 will be described later in detail. Hereinafter, when only referred to as "back light", this means light of back light.

Next, the image forming portion 200 and the sheet conveying portion 300 constituting process means will be described. As shown in FIG. 1, the image forming portion 200 is provided with a photosensitive roller 28 as image forming means, a charging portion 29, a developing portion 30, a transfer charger 31, a cleaner 32 and the laser scanning unit (LSU, not shown).

The photosensitive roller 28 which is drum-shaped is rotated in the direction of the arrow (counterclockwise) at a predetermined process speed. The charging portion 29 evenly charges the surface of the photosensitive roller 28 to a predetermined potential. The LSU exposes the charged surface of the photosensitive roller 28 with a laser beam to thereby form on the surface an electrostatic latent image corresponding to the image data generated by the scanner portion X.

The developing portion 30 develops the electrostatic latent image formed by the LSU with a developing roller 30*a* to thereby form a toner image on the photosensitive roller 28. The transfer charger 31 transfers the toner image on the photosensitive roller 28 to a sheet. After the toner image is transferred to the sheet, the cleaner 32 removes the residual toner on the photosensitive roller 28.

In the image forming portion 200, the following are provided: image receiving means 110 for receiving image information from a terminal (not shown) such as a computer or a facsimile connected to a network (not shown); and line image receiving means 120 for receiving image information from a telephone line (not shown).

The sheet conveying portion 300 is provided with: a main conveyance path F, a paper feed conveyance path N, a sub conveyance path S, a manual paper feed conveyance path M, an ejection conveyance path R, a fixed paper feed cassette 15, a manual paper feed tray 16, pickup rollers 18, paper feed rollers 19 and 21, resist rollers 22, fixing rollers 23 as fixing means, paper ejecting rollers 25, a paper ejection slit 40, a paper output tray 39, conveying rollers 271, 272 and 273, and a non-illustrated pre-resist detection switch, fixed paper detection switch and ejected paper detection switch. Such a sheet conveying portion 300 defines a path from the fixed paper feed cassette 15 and the manual paper feed tray 16 provided in a bottom portion of the compound apparatus through the image forming portion 200 to the paper output tray 39.

The fixed paper feed cassette 15 is for holding sheets P on which printing is performed. The structure of the fixed paper cassette 15 will be described later. The manual paper feed tray 16 is for feeding sheets P of kinds that cannot be placed in the fixed paper feed cassette 15 or that the user does not want to place in the fixed paper feed cassette 15.

The pickup rollers 18 are semicircular rollers disposed in the vicinity of an end of the fixed paper feed cassette 15 on a side close to the paper feed conveyance path N and in the vicinity of an end of the manual paper feed tray 16 on a side close to the manual paper feed conveyance path M and drawing out sheets P from the trays 15 and 16. The fixed paper feed cassette 15 and the pickup rollers 18 will be described later.

The paper feed rollers 21 are conveyance rollers for sending the sheet P drawn out of the manual paper feed tray 16 to the main conveyance path F by way of the manual paper feed conveyance path M. Likewise, the paper feed rollers 19 send the sheet P drawn out of the fixed paper feed cassette 15 to the main conveyance path F by way of the paper feed conveyance path N.

The fixed paper feed cassette 15 and the manual paper feed tray 16 are each provided with a non-illustrated sheet handling portion that provides assistance in drawing out sheets P. The sheet handling portion can be formed of a roller and a friction sheet member or a counter-rotating roller.

The paper feed conveyance path N, the sub conveyance path S and the manual paper feed conveyance path M join on the upstream side of the resist rollers 22 (the cassette side is the upstream side, and the ejection side is the downstream side). In the vicinity of the junction, the pre-resist detection switch is provided.

The pre-resist detection switch outputs a predetermined detection signal when detecting that the sheet P being conveyed toward the main conveyance path F has passed through a predetermined position.

The resist rollers 22 temporarily hold the sheet P conveyed from the main conveyance path F and send the sheet P to the transfer charger 31 at an appropriate time in accordance with the rotation of the photosensitive roller 28 so that the toner image on the photosensitive roller 28 is excellently transferred onto the sheet P.

That is, based on the detection signal output by the pre-resist detection switch, the resist rollers 22 send the sheet P at a time such that the front end of the toner image on the photosensitive roller 28 is pressed onto the front end of the printing area of the sheet P.

The fixing rollers (temperature setting requiring portions) 23 as the fixing means having a heat source and requiring temperature setting crush at a high temperature and a high pressure the toner image on the sheet P having undergone printing, thereby thermally fixing the toner image on the sheet P. The fixing rollers 23 each have inside a heater that increases the temperature of the fixing roller 23 to a predetermined fixing temperature, and sandwich the sheet P therebetween with a predetermined pressurizing force. The fixed paper detection switch (not shown) detects that the sheet P has passed through the fixing rollers 23.

On the downstream side of the fixing rollers 23, the diverging point (junction) of the main conveyance path F and the sub conveyance path S is disposed. At the diverging point, a guide member 41 for setting the conveyance path of the sheet P is provided. Further, in the vicinity of the ejection slit 40 situated at the termination of the ejection conveyance path R, the paper ejecting rollers 25 for ejecting the sheet P onto the paper output tray 39 are provided.

The paper ejecting rollers 25 and the guide member 41 are set so as to function as a double-sided printing mechanism together with the sub conveyance path S. That is, in normal single-sided printing, by turning the guide member 41 upward, the main conveyance path F communicates with the path to the paper ejecting rollers 25. Consequently, the sheet P having passed through the fixing rollers 23 is conveyed to the ejection conveyance path R and is then ejected onto the paper output tray 39 by the paper ejecting rollers 25.

In a case where printing is performed on both surfaces of the sheet P, when printing on one surface of the sheet P is finished and the sheet P is conveyed from the main conveyance path F to the ejection conveyance path R, the guide member 41 is turned downward, so that the sub conveyance path S communicates with the path to the paper ejecting rollers 25.

Then, the paper ejecting rollers 25 rotate in the forward (positive) direction (paper ejection direction) until the rear end of the sheet P passes through the guide member 41, and then, rotate in the reverse direction while holding the sheet P. Consequently, the sheet P is conveyed to the sub conveyance path S from the rear end, and is conveyed again to the resist rollers 22 through the conveyance rollers 271 to 273. Then, printing is performed on the other surface. In the vicinity of the guide member 41, a detection switch (not shown) for detecting whether the sheet P has passed in the vicinity of the guide member 41 is provided. This compound apparatus has a facsimile function, a scanner function and a printer function as well as the copier function. Details of the functions of these modes will not be described.

In this copier having the above-described structure, in order that information such as the working condition of the apparatus that the user wants to obtain is displayed in a visually easy-to-recognize manner, a display condition control portion 101 having various kinds of computing functions (CPUs) and storage functions (a ROM, a RAM) is provided in the scanner portion 100, and the display condition of the LCD display portion 8 of the operation panel 6, that is, the color and the density of the back light and character displayed on the display portion 8 (hereinafter, referred to as liquid crystal character), for example, are varied according to the working condition and the operation condition of the apparatus. When an abnormality occurs, the apparatus is stopped.

With the display condition control portion 101, without the need to display characters or newly provide an operation button or the like, by controlling the conventionally used back light elements and liquid crystal character of the LCD display portion 8 of the operation panel 6, the structure is simpler than in the case where characters are displayed, and without the need for space, the LCD display portion 8 can be structured and the condition of the apparatus can be grasped from outside at a glance. The display condition control portion 101 may be provided in the control portion.

Figure 2:
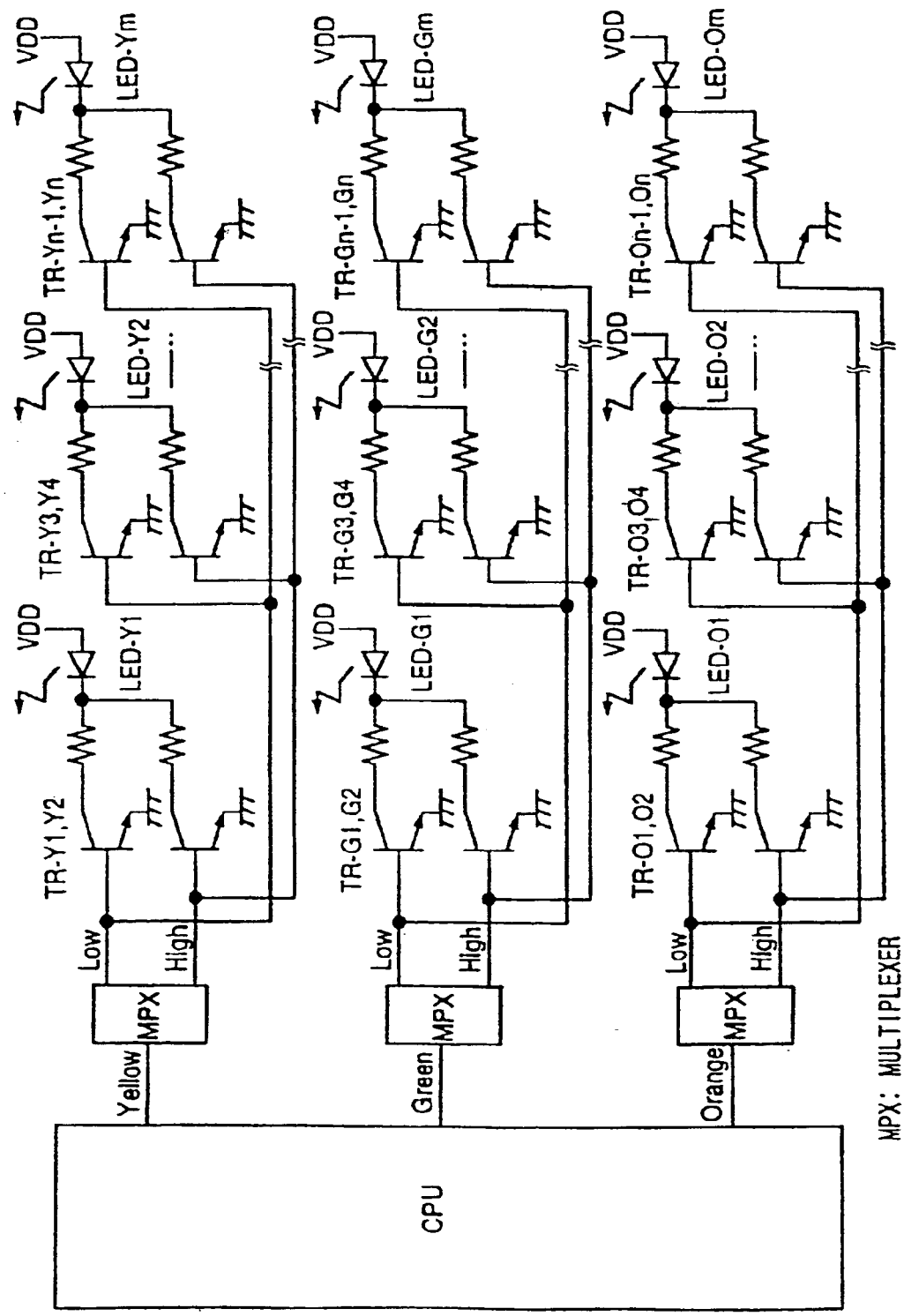
FIG. 2 is a circuit diagram of a light emitting portion in the first embodiment.

The change of the back light can be realized, as shown in the circuit diagram of the light emitting portion in FIG. 2, by separate light emitting diodes LEDs (LED-Y1, Y2, ..., Ym, LED-G1, G2, ..., Gm, and LED-O1, O2, ..., Om) of three colors connected to the central processing unit CPU through multiplexers (MPX), transistors (TRs-Y1, Y2, . . . Ym, TR-G1, G2, ..., Gn, TR-O1, 02, ..., Om), and resistors. Hereinafter, the transistors TR-Y1, ..., On are generically referred to as transistor TR. The light emitting diodes LED-Y1, . . . , Om are generically referred to as light emitting diode LED. Further, there is the case where the light emitting diode is only referred to as LED.

In detail, the multiplexer MPX divides a signal from the CPU into a low signal and a high signal, and includes a low signal output terminal for outputting the low signal and a high signal output terminal for outputting the high signal. A signal light emitting diode is provided with two transistors TR and two resistors. The two transistors TR are arranged in parallel. Each of collector terminals of transistors TR is electrically connected to each of resistors. Each of emitter terminals of transistors TR is grounded. A cathode side of the light emitting diode LED is commonly and electrically connected to each of resistors. A voltage VDD is applied to an anode side of the light emitting diode LED. A base terminal of one transistor TR is electrically connected to the low signal output terminal of the multiplexer MPX. A base terminal of another transistor TR is electrically connected to the high signal output terminal of the multiplexer MPX.

A plurality of combinations of two transistors, two resistors and single light emitting diode is provided in parallel with respect to single multiplexer MPX. The mulitplexer MPX connecting the above electric arrangement is provided for each color. Each of multiplexers MPX for each color is electrically connected to the CPU.

That is, in this embodiment, one pixel is formed of three colors of light emitting diodes (yellow, green and orange) as back light element, and information (signal) on the working condition of the apparatus is input to the display condition control portion 101 and the high signal or the low signal is output from the display condition control portion 101 to each light emitting diode LED in accordance with the working condition, thereby changing the back light in accordance with the condition, at that point in time, of the apparatus.

In this case, one pixel is controlled by a plurality of single-color LEDs. In the case where a color LED capable of emitting lights of a plurality of colors is used, since one pixel can be controlled by a single LED, the circuit of FIG. 2 can be simplified. Further, as the back light element, a plurality of single-color electroluminescent (EL) elements may be used. Furthermore, a color electroluminescent (EL) element capable of emitting lights of a plurality of colors may be used.

While the color of the LCD display portion 8 can be freely controlled by changing the hue of color of the back light, by controlling (changing) only the color of the liquid crystal character without changing the color of the back light, viewability or visual sensitivity different from that obtained when the back light is changed can be ensured.

However, when only the color of either the back light or the liquid crystal character is changed, there are cases where characters are difficult to view. For example, when characters of a dark color are displayed on a dark back light color, not only are the characters difficult to view but also viewability or visual sensitivity deteriorates, which can degrade the operability of the apparatus.

That is, changing only the color of either the back light or the liquid crystal character has a limitation, and therefore, when the back light color is changed, it is desirable to change the color of the liquid crystal character as well in accordance with the change of the back light color. Further, when the color of the back light and liquid crystal character is chromatic color, by changing the color of the back light and the color of the liquid crystal character so as to be in a complementary color relationship, the viewability or the visual sensitivity of the LCD display portion 8 can be improved.

When the color of the back light is visually a bright color, characters may be displayed in black as has conventionally been done and only when the color of the back light is visually a dark color, outline characters may be displayed. Thereby, high contrast is obtained, so that an easy-to-view display condition can be maintained. For example, as shown in the examples of displays on the operation panel in TABLE 1, when the color of the liquid crystal character is mixed with the color of the back light, by displaying characters in colors as shown in the table, viewability or visual sensitivity can be improved.

TABLE 1

| Backlight color | Liquid crystal character color | User visibility |
|---|---|---|
|  Yellow | On standby BLue |  Characters are black |
| 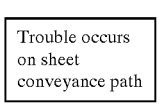 Cyan | Printing Red | Printing<br>Characters are black |
| Magenta | Trouble occurs on sheet conveyance path Green | Trouble occurs on sheet conveyance path<br>Characters are black |
| 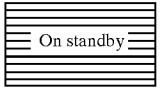 Yellow | On standby BLue | On standby<br>Characters are black |
| 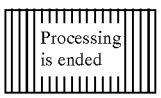 Green | Processing is ended Yellow | Processing is ended<br>Characters are white |

The change (control) of the color of the liquid crystal character can be easily realized by controlling the voltage applied to the electrodes of the liquid crystal cells constituting the liquid crystal display element by the display condition control portion 101. In addition, the change of the color of the back light can be easily realized by controlling the voltage applied to the electrodes of the liquid crystal cells constituting the liquid crystal display element by the display condition control portion 101 and selecting the color through the liquid crystal display element. In particular, when the back light color is changed, by changing (adjusting) the liquid crystal character at the same time by the display condition control portion 101, the viewability or the visual sensitivity of the LCD display portion 8 can be significantly improved.

Figure 3:
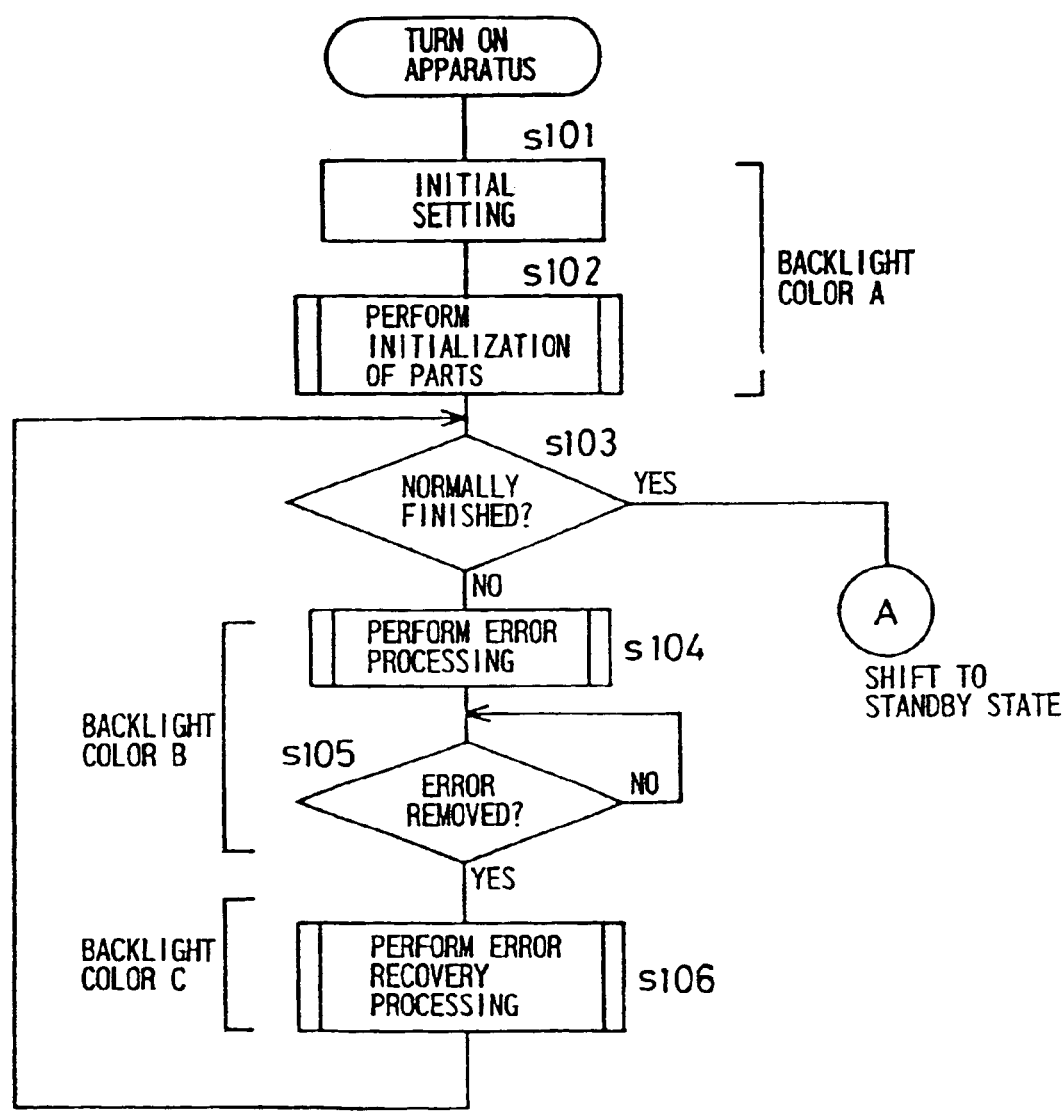
FIG. 3 is a part of a flowchart for explaining a processing procedure in the first embodiment.

Next, the time when the color of the back light is actually changed and the classification of the hue will be described with reference to the flowchart of FIG. 3 showing a principal processing procedure from the turning on of the apparatus.

First, by turning on the apparatus, a pre-initialization processing of the apparatus is performed at step s101, and initialization of parts is performed at step s102. Whether the initialization at step s102 is finished normally or not is determined at step s103. When the initialization is finished normally, the process shifts to a normal route from step s111.

When the initialization is finished abnormally, the process shifts to a quasi-normal route from step s104. At step s104, a factor responsible for the abnormal finish is recognized, and an error processing (for example, notifying the user that the apparatus is out of toner) is performed. At step s105, whether all the error factors responsible for the abnormal finish are removed or not is determined, and a waiting process is performed until all the error factors are removed. When all the errors are removed, the process proceeds to step s106, and after an error recovery processing (corresponding, for example, to the initialization of parts at step s102) is performed, the process returns to step s103 to repeat the loop processing until the error factors are removed.

When the process shifts to the normal route, whether there is a request for copying from the user or not is determined at step s111. When there is a request for copying, the process proceeds to step s121. The case where there is no request for copying will be described. When there is no request for copying, whether or not there is a request for a shift to an energy saving mode (including an energy saving mode performed in response to the user's instruction and an energy saving mode by an idling time of the apparatus) is determined at step s122. When there is a request for a shift to the energy saving mode, an energy saving processing associated with the energy saving mode is performed at step s117. When there is no request for a shift to the energy saving mode, the process shifts to step s113.

At step s113, whether some error factor occurs or not is determined. When no error occurs, the process proceeds again to step s111, and the loop processing from step s111 to step s113 is performed as long as no error occurs. When an error occurs, the process shifts to step s114.

At step s114, the processing to handle the occurring error (including provision of an instruction to the user) is performed. At step s115, whether the error is removed or not is determined. The loop processing is performed until the error is removed, and when the error is removed, the process shifts to step s116. At step s116, after initial setting and the like because of the error recovery is performed, the process shifts to step s111 to repeat the loop processing associated with the wait for a request for copying from the user.

In the processing from step s117 associated with the energy saving mode, first, at step s117, an energy saving processing (for example, stopping power supply to each part of the drive portion and the process portion of FIG. 1) is performed. When it is determined in the loop processing at step s118 that a request to cancel the energy saving mode is made, the process shifts to step s119 to end the energy saving mode, and after the normal state is resumed, the process shifts to step s111 to repeat the loop processing associated with the wait for a request for copying from the user.

When there is a request for copying, at step s121, a pre-copying processing (for example, agitation of toner in the developing portion 30 of FIG. 1) is performed, and at step s122, whether the pre-copying processing is finished normally or not is determined. When the pre-copying processing is finished abnormally, an error processing is performed (although details of this processing are not given, when the error can be handled by the user, an instruction is given to the user, and when a problem that cannot be handled by the user is caused, the user is notified of this). When the pre-copying processing is finished normally, the process shifts to step s123.

At step s123, a reading preparation in the scanner optical system 10 of FIG. 1 is performed. At step s124, whether the reading preparation is finished normally or not is determined. When the reading preparation is not finished normally, an error processing is performed. When the reading preparation is finished normally, the process shifts to step s125

Step s125 and succeeding steps are at a stage in which a copying processing is actually performed. First, at step s125, a sheet P is fed from the fixed paper feed cassette 15 of FIG. 1 or the like and is conveyed to the resist rollers 22. At step s126, the original image placed on the original table 7 of FIG. 1 is read by the scanner optical system 10. At step s127, the original image read at step s126 is printed onto the sheet P.

At step s128, whether an abnormality occurs in the copying processing or not is determined. When an abnormality occurs, an error processing is performed. When the copying processing is finished normally, the process shifts to step s129.

At step s129, whether there is another job or not is determined. When there is another job, the process shifts to steps 125 to perform the loop processing associated with copying, and when all the jobs are finished, the process shifts to step sill to repeat the loop processing associated with the wait for a request for copying from the user.

Figure 4:
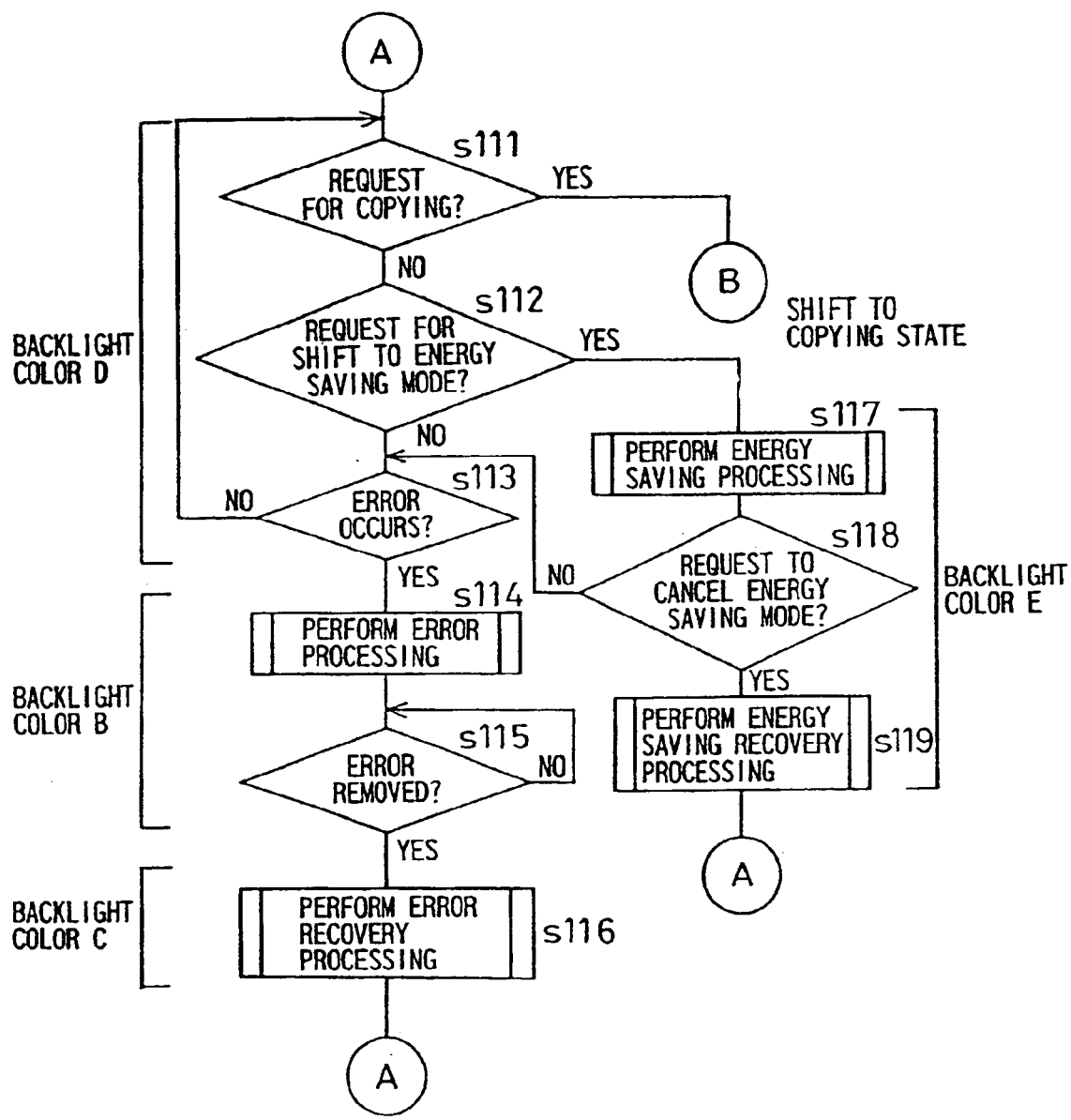
FIG. 4 is another part of the flowchart.
Figure 5:
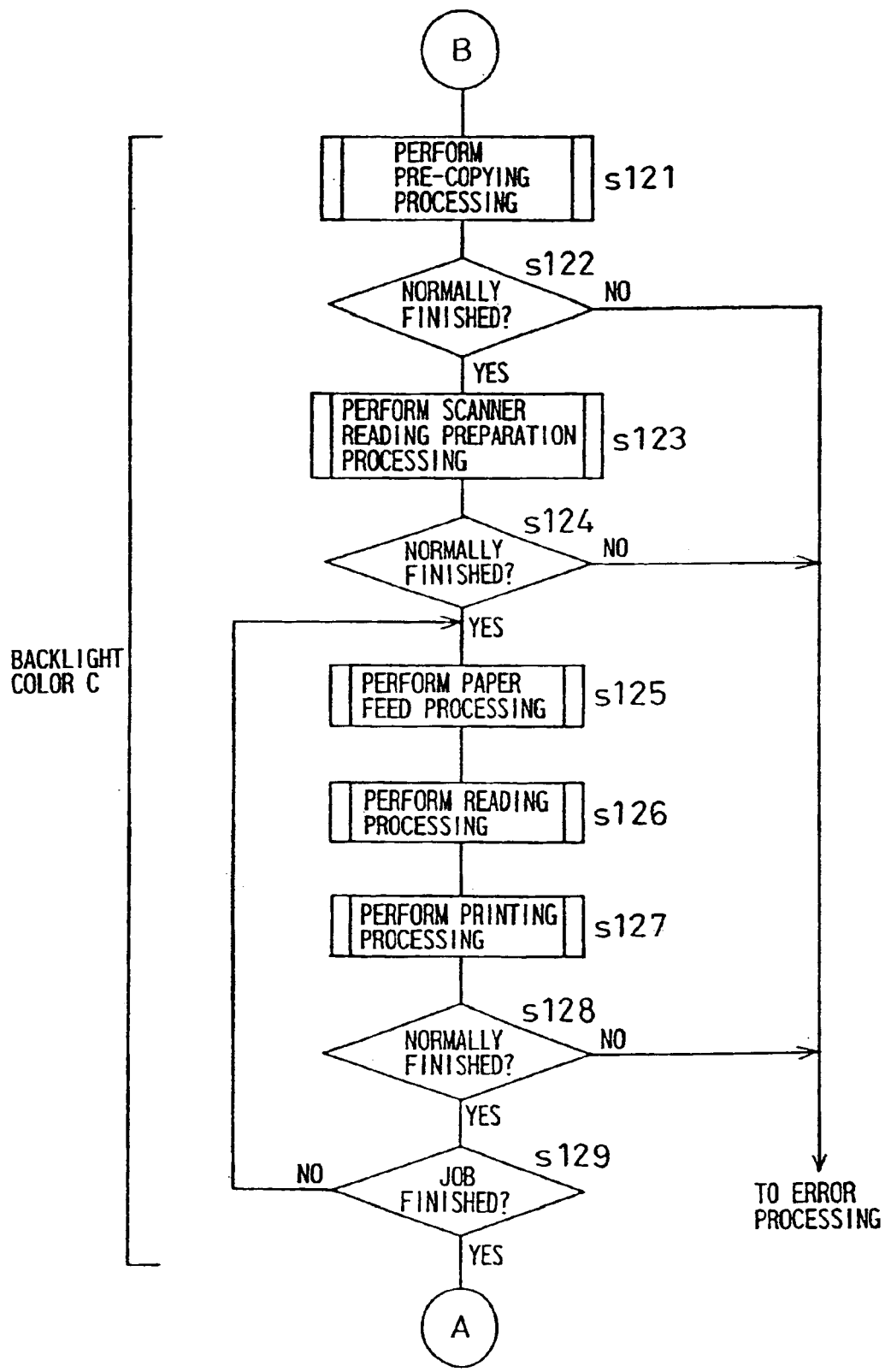
FIG. 5 is the remaining part of the flowchart.

This is the main processing procedure from the turning on of the apparatus to the copying processing. In FIGS. 3 to 5, examples of back light colors (A to E) at the steps are specified. The mode transition condition, the back light color and the displayed character color can be set, for example, in a correspondence relationship as shown in TABLE 2.

TABLE 2

| Mode transition condition | | | Back light hue | | Displayed character hue |
|---|---|---|---|---|---|
| During warmup | During initialization of scanner | | Color A | Color A-1 | Complementary color of color A-1 |
| | During initialization of printing process portion | | | Color A-2 | Complementary color of color A-2 |
| | During initialization of facsimile | | | Color A-3 | Complementary color of color A-3 |
| | During initialization of control portion | | | Color A-4 | Complementary color of color A-4 |
| | During detection of presence or absence of sheet on sheet conveyance path | | | Color A-5 | Complementary color of color A-5 |
| | While fixing temperature is increasing | | | Color A-6 | Complementary color of color A-6 |
| | When trouble occurs | | Color X flashes | | Complementary color of color X |
| During standby state | Energy saving mode | | Turned off | | |
| | During standby state | | Color B | | Complementary color of color B |
| When copier request is made | | | Color B | | Complementary Color Of Color B |
| During setting of condition | During setting of printing magnification | | Color C | Color C-1 | Complementary color of color C-1 |
| | During setting of printing sheet size | | | Color C-2 | Complementary color of color C-2 |
| | During setting of original reading condition | | | Color C-3 | Complementary color of color C-3 |
| | During setting of post-processing of sheet | | | Color C-4 | Complementary color of color C-4 |
| | During setting of number of copies | | | Color C-5 | Complementary color of color C-5 |
| | . . . | | | Color C-6 | Complementary color of color C-6 |
| | | | . | . | . |
| | When trouble occurs | | Color X flashes | | Complementary color of color X |
| | When condition setting is completed | | Color C | | Complementary color of color C |
| Processing steps | Normal processing | During Original Reading | Color D | Color D-1 | Complementary color of color D-1 |
| | | During Printing | | Color D-2 | Complementary color of color D-2 |
| | | During Post-Processing | | Color D-3 | Complementary color of color D-3 |
| | | During Normal Processing | Color D | | Complementary Color Of Color D |
| | When trouble occurs | Jam of original sheet Faulty original reading Jam of printing sheet Mechanical trouble Process trouble Electric trouble . . . | Color X flashes | | Complementary color of color X (Contents of trouble are displayed in characters) |
| | End of process | | Color Y (or color B may be used) | | Complementary color of color Y |

The back light color A is specified as the color representative of the period from the turning on of the apparatus to the initialization of the parts at step s101 and step s102. The back light color B is specified as the color representative of the period during which an error processing is performed in the initial setting and in the copying waiting state at steps s104 and s105 and steps s114 and s115. The back light color C is specified as the color representative of the period of the error recovery at step s106 and step s116. The back light color D is specified as the color representative of the period during which the user usually makes a request for copying before printing at steps s111 to s113. The back light color E is specified as the color representative of the period during which the processing in response to the request for copying is performed at steps s121 to s129.

For example, the back light color A representative of the period after the turning on of the apparatus is light blue, the back light color B representative of the error processing stage is red, the back light color C representative of the error recovery processing stage is yellow, the back light color D representative of the state in which a request for copying from the user is waited for is light green, and the back light color E representative of the stage in which copying is actually started is dark green, whereby the user can recognize the condition of the apparatus only by recognizing the color of the back light. This improves usability. The hue of the back light color is not limited thereto, but may be selected or set as required.

Next, an image forming apparatus according to a second embodiment of the invention will be described in detail with reference to FIGS. 6 to 9.

Figure 6:
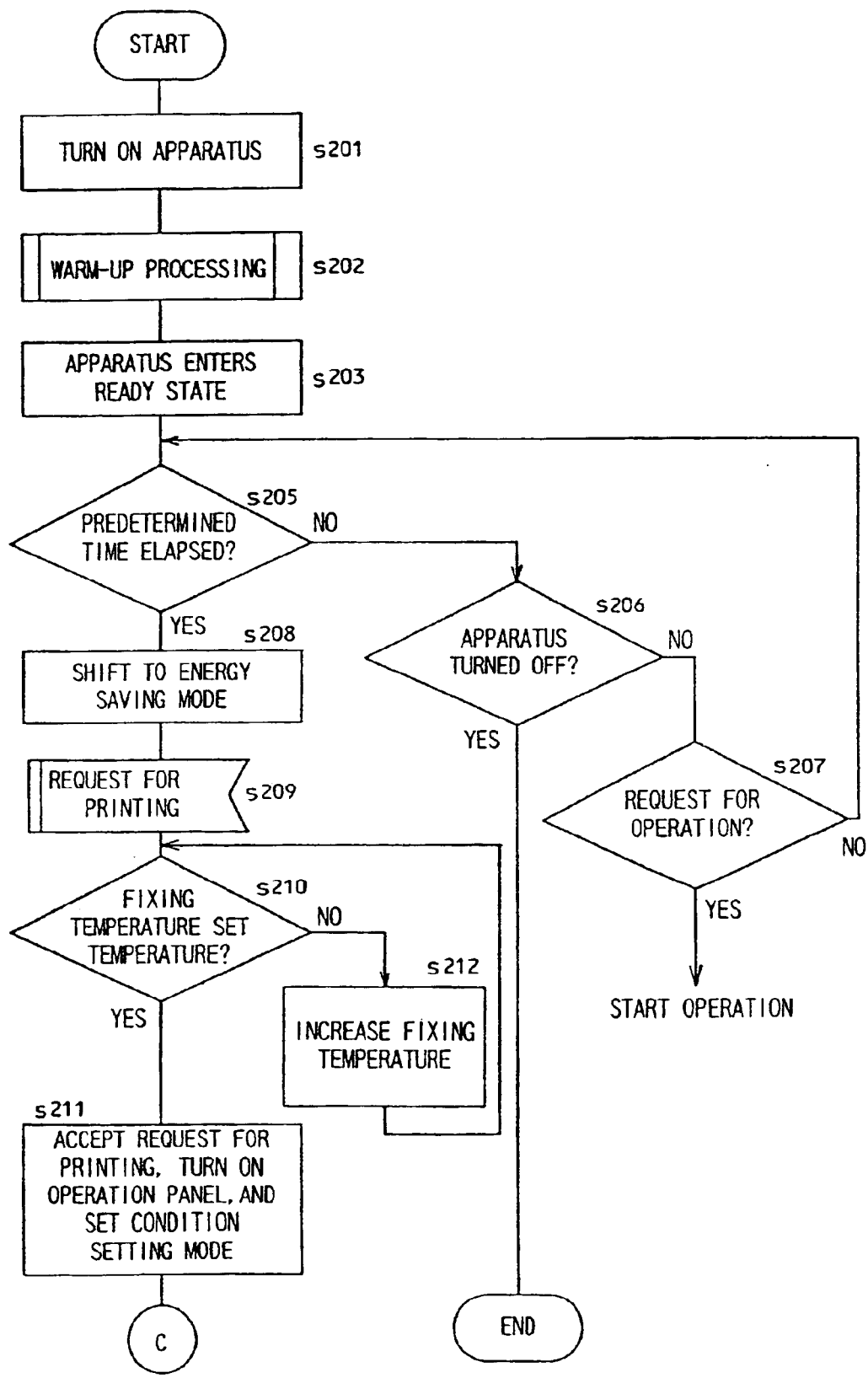
FIG. 6 is a part of a flowchart for explaining a processing procedure of an image forming apparatus according to a second embodiment of the invention.
Figure 7:
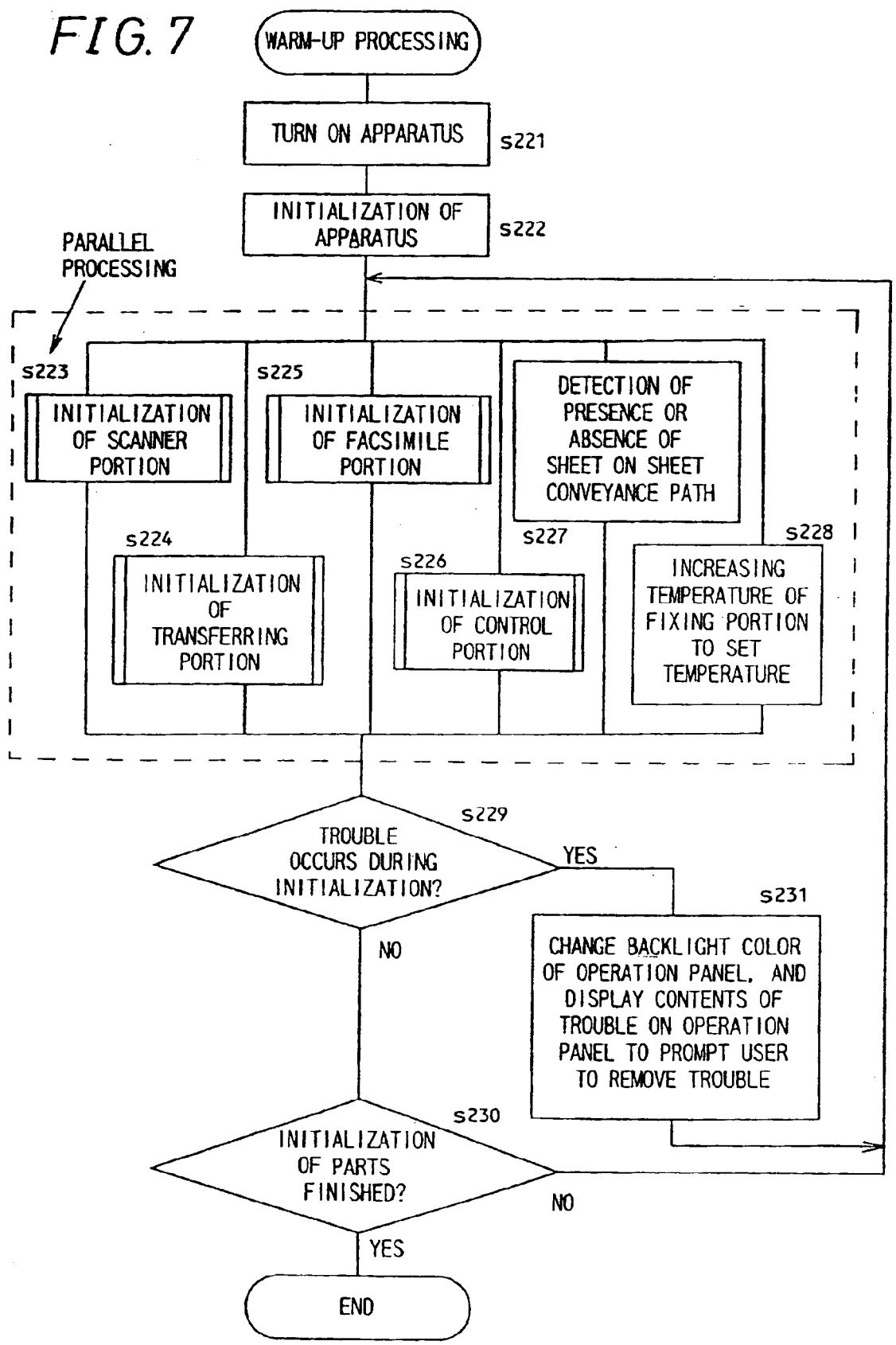
FIG. 7 is another part of the flowchart.
Figure 8:
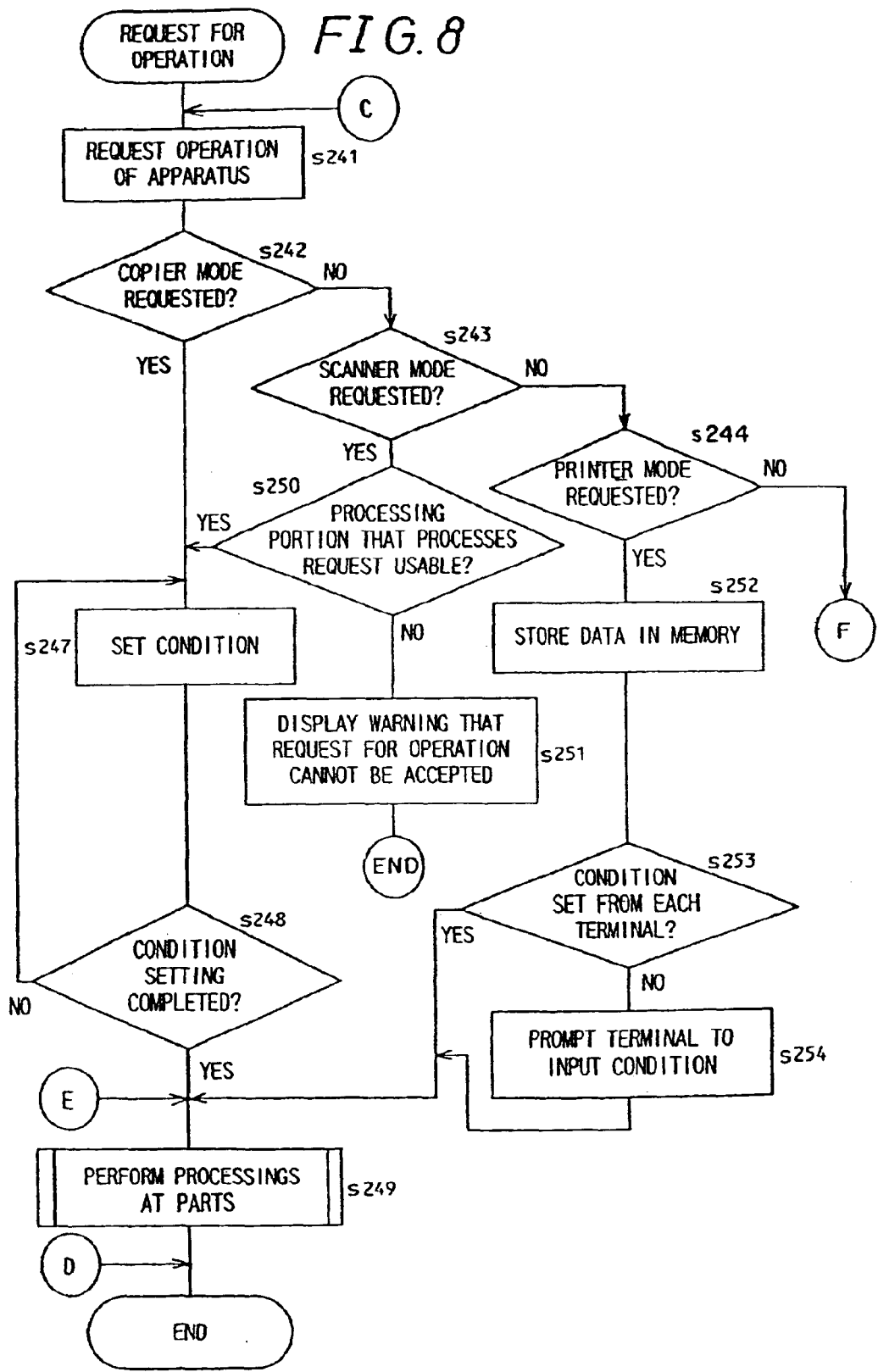
FIG. 8 is still another part of the flowchart.
Figure 9:
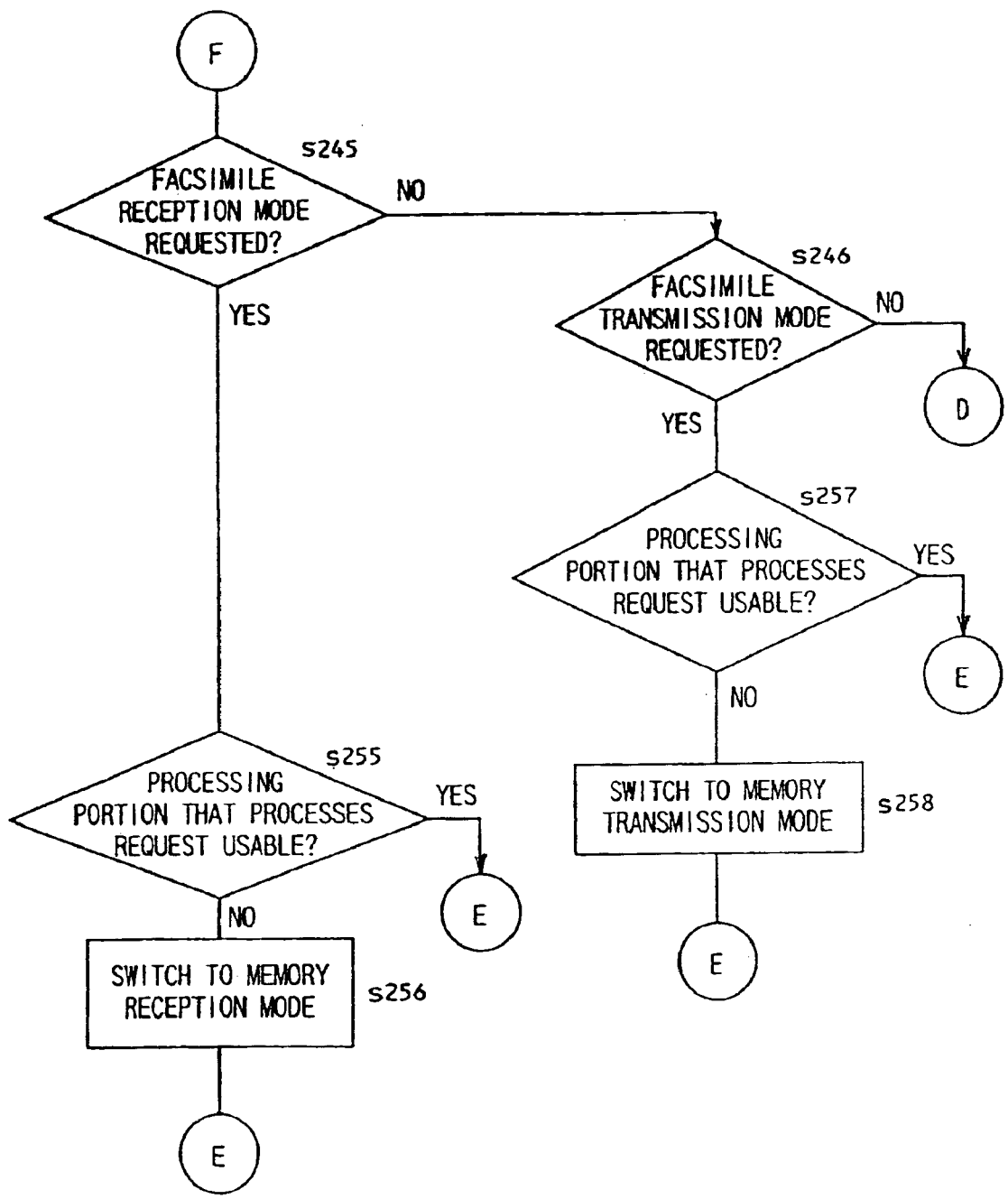
FIG. 9 is the remaining part of the flowchart.

First, by the turning on of the apparatus by the user at step s201 of FIG. 6, the process proceeds to step s221 of FIG. 7 to perform a warm-up processing (step s202), and power is supplied to each part of the apparatus and initialization of each part is performed (step s222). Then, the following are performed in parallel: initialization of the scanner portion 100 (see FIG. 1) at step s223; initialization of the image forming portion 200 (see FIG. 1) at step s224; initialization of the facsimile portion at step s225; initialization of the control portion (including the display condition control portion 101) at step s226; detection of the presence or absence of a sheet on the sheet conveyance path at step s227; and increasing the temperature of the fixing portion (the fixing rollers 23 of FIG. 1) to a set temperature at step s228.

Then, at step s229, whether a trouble occurs during the parallel processing or not is determined. When a trouble is detected, at step s231, the back light color of the LCD display portion 8 of the operation panel 6 is changed and a character string representative of the contents of the trouble is displayed. At step s230, the parallel processing is repeated until it is detected that the initialization of the parts is finished. When the initialization of the parts is finished, the warm-up processing is ended and the apparatus enters the ready state (step s203 of FIG. 6).

After the apparatus enters the ready state at step s203, the process shifts to step s205, step s206 or step s207, and waits for a request for an operation of the apparatus or a change of the condition of the apparatus. When it is detected that the user turns off the apparatus (step s206), after a processing associated with the turning off of the apparatus is finished, the process is ended.

Then, at step s205, after a predetermined time has elapsed, the process shifts to the energy saving mode at step s208 (a power saving function for each part, details are not given). While the energy saving mode is being executed, when a request for printing from the user is recognized (step s209), whether the temperature of the fixing portion (the fixing rollers 23 of FIG. 1) reaches the fixing temperature or not is determined (step s210), and when the fixing temperature is not reached, the temperature of the fixing portion is increased, for example, by heating the heaters in the fixing rollers 23 of FIG. 1.

When the temperature of the fixing portion reaches the set temperature, the request for printing is accepted, the LCD display 8 of the operation panel 6 is turned on, and setting menus of various kinds of modes of the apparatus and the like are displayed (step s211). Then, the process shifts to step s241 of FIG. 8. Step s241 and succeeding steps will be described later.

In an interrupt waiting state at step s203 and step s205, when the user makes a copier request or the like, in a case where it is determined that there is a request for an operation at step s207, the process proceeds to step s241. At step s241, the content of the request for the operation from the user is recognized, and determination as to which operation is requested is made at step s242 to step s246.

When the content of the request for the operation is a copier mode, the process proceeds to step s247. When the content is a scanner mode, the process proceeds to step s250. When the content is a printer mode, the process proceeds to step s252. When the content is a facsimile reception mode, the process proceeds to step s255. When the content is a facsimile transmission mode, the process proceeds to step s257.

At step s247 in the case of the copier mode, condition setting is repeated until setting of various copying conditions is completed (step s248), and when the condition setting is finished, at step s249, the processings of parts associated with the copier processing are performed. Then, the process is ended.

At step s250 in the case of the scanner mode, whether the processing portion that performs scanning is usable or not is determined (this is because when a function not using the original table 7 of FIG. 1 is on like in the printer mode, the printer mode and the scanner mode can be processed in parallel). When scanning is possible, the process proceeds to step s247 to set various processings associated with the scanner mode. When scanning is impossible, an indication that the scanner mode is impossible is provided on the LCD display portion 8 of the operation panel 6 at step s251. Then, the process is ended.

At step s252 in the case of the printer mode, the received printing data is stored in a memory, and at step s253, whether a printing condition is set in the received data or not is determined. When no printing condition is set, the terminal that activated the printer mode is prompted to input a printing condition at steps 254. When a printing condition is duly input, the process proceeds to step s249 to perform the processings of parts associated with the printer mode, that is, to form an image on a sheet. Then, the process is ended.

At step s255 in the case of facsimile reception mode, whether the image forming portion 200 of FIG. 1 or the like that forms an image of the received facsimile is usable or not is determined (this is because in the case of facsimile reception, it is possible to temporarily store the content of the received facsimile without immediately printing the received facsimile (forming an image of the received facsimile) and print the stored content later). When the image forming portion B or the like is usable, the process proceeds to step s249 to perform the processings of parts associated with facsimile reception. Then, the process is ended. When the image forming portion B or the like is unusable, after the facsimile mode is switched to a memory reception mode at step s256, the process proceeds to step s249 to perform the processings of parts associated with facsimile memory reception. Then, the process is ended.

Lastly, when it is determined at step s246 that the content of the request is the facsimile transmission mode, whether a communication portion (not shown in FIG. 1) or the like that performs facsimile transmission is usable or not is determined at step s257. When the communication portion or the like is usable, the process proceeds to step s249 to perform the processings of parts associated with facsimile transmission. Then, the process is ended. When the communication portion or the like is unusable, after the facsimile transmission mode is switched to a memory transmission mode at step s258, the process proceeds to step s249 to perform the processings of parts associated with facsimile memory transmission. Then, the process is ended.

As described above, in order that the contents of compositely performed operations of the apparatus can be intuitively grasped from outside at a glance, according to this embodiment, by making the color, in particular, the hue of the back light of the LCD display portion 8 variable and setting the color of the back light to separate reference colors in accordance with the above-described processing modes (the printer mode, the copier mode, etc.), the user can immediately recognize the working condition and the operation condition of the apparatus by recognizing the back light color of the LCD display portion 8.

That is, in this case, as shown in TABLE 1 shown above, by setting the displayed character color of the liquid crystal in a complementary color relationship in accordance with the reference color of the back light and changing the hue of the liquid crystal characters in accordance with the change of the hue of the back light, the viewability (visual sensitivity) of the characters is improved so that the characters are easy to read.

In the case of a compound apparatus, for example, facsimile transmission and facsimile reception are possible while the printer mode is on. However, when such a processing condition is displayed in characters on the LCD display portion 8, there are cases where the liquid crystal characters are difficult to recognize, and this can degrade the operability of the apparatus. According to this embodiment, this drawback is removed by the above-described handling.

Moreover, in TABLE 1, when the apparatus is in the energy saving mode in the standby state for a predetermined time, by turning off the back light, the power consumed by the apparatus can be further reduced (energy saving).

Further, by changing the color of the back light, in particular, the hue in accordance with the processing step (for example, distinction between during printing and during condition setting) in each processing mode, not only the processing mode that is on but also the step of the processing mode (which step of the processing mode the apparatus is in) can be recognized by the hue of the back light.

Aside from the working condition and the operation condition of the apparatus, for a processing situation requiring immediate attention like paper jam in the image forming portion 200 or the sheet conveyance portion 300 of FIG. 1, by setting the same back light color, in particular, the same hue as the hue representative of such a processing situation for all the processing modes, judgment on the trouble is facilitated, so that the processing can be finished quickly.

When the hues of the back light representative of troubles differ among the processing modes, since in which processing mode the trouble occurs can be easily recognized, the user who executed (operated) the processing mode directly or indirectly can handle the trouble positively, so that the burden on other users who did not execute the processing can be lightened.

With respect to this point, taking a case of a paper jam as an example of troubles, the portion to be handled by the user differs according to the location of the paper jam such as the conveyance path, the paper feeding portion or the paper ejecting portion, and particularly, in the case of a paper jam on the periphery of the photosensitive roller, for users not accustomed to maintenance, it takes much time to process the trouble, so that the rate of operation of the apparatus deteriorates.

According to this embodiment, when troubles occur, by changing both the color, in particular, the hue of the back light of the LCD display 8 and the displayed characters of the liquid crystal in accordance with the trouble factors and the processing level, the viewability (visual sensitivity) is improved so that the display content is easy to read, whereby the user who executed the processing can efficiently process the troubles by handling the trouble factors. Consequently, deterioration of the rate of operation of the apparatus can be suppressed effectively.

Next, a display device of an image forming apparatus according to a third embodiment of the invention will be described in detail with reference to FIGS. 10 to 13.

FIG. 11A shows the structure of the LCD display portion 8 of the conventional operation panel 6. In this case, the parts in the LCD display portion 8 are not specifically separated but are integral. However, in this embodiment, the LCD display portion 8 is divided as shown in FIG. 11B. For understanding of the drawings, the dotted lines in the figure is provided for the sake of convenience, since of course the dotted lines are invisible, the LCD display portion 8 does not appear to the user to be divided.

Not only a method of displaying various pieces of information in a concentrated manner as shown in FIG. 11B which method is used by conventional apparatuses but also a method may be used of displaying pieces of information with intervals (margins) in between as shown in FIG. 11C so that the information is easily readable by the user. The condition when the user sets the number of copies is shown in FIG. 11D. By making the unnecessary information on the operation panel temporarily undisplayed and displaying only the content associated with the operation, it is made clear which part of the LCD display portion 8 the user should pay attention to when setting the condition, so that operability is improved.

Next, a method of structuring the light emitting portion when the LCD display portion 8 is structured so that information is displayed on a divided screen will be described with reference to the diagram, of FIG. 10, of the circuit associated with the light emitting portion.

Figure 10:
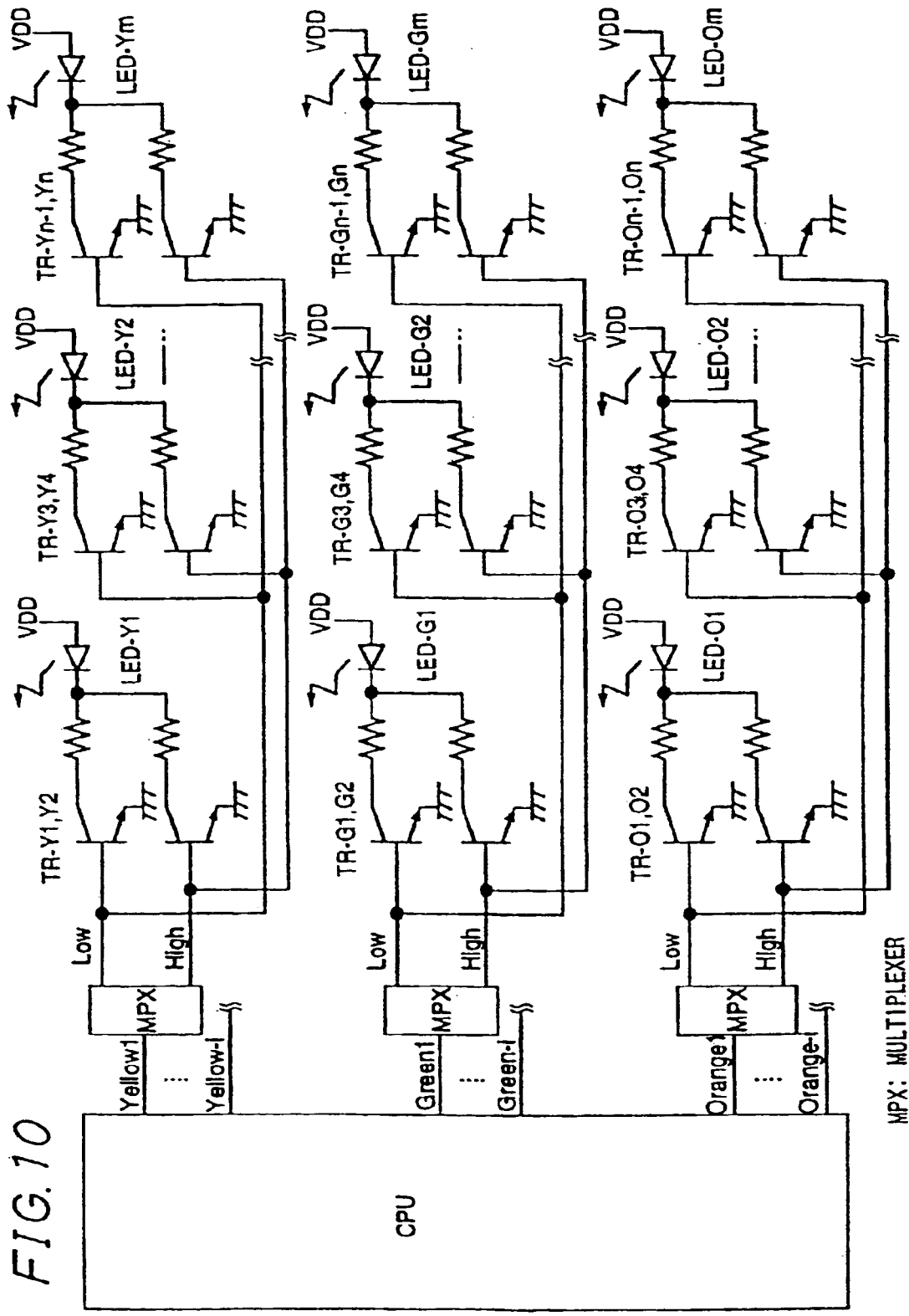
FIG. 10 is a circuit diagram of a light emitting portion of an image forming apparatus according to a third embodiment of the invention.

In the circuit of FIG. 10, like in the case of FIG. 2, one pixel is formed of three pixels. Light emitting diodes (LEDs) (yellow, green and orange) constituting the light emitting portion are each controlled by a CPU, and the hue of color of the back light can be changed according to the change of the apparatus condition (the change of the working condition and the operation condition).

Further, a plurality of pairs of light emitting diode (LED) control lines of each color are separately provided, for example, in the case of yellow, LED control lines Yellow1 to Yellow-i are provided. That is, the LED control lines for each color are separately provided for each segment surrounded by the dotted line, as shown in FIGS. 11B to 11D. Thereby, it is possible to divide the LCD display portion 8 of the operation panel 6 into segments surrounded by the dotted line and control the back light for each segment. By the divisional control of the back light elements as described above, for example, the temperature in the apparatus in a desired display condition, and a change of the color, in particular, the hue and a change of the brightness of the back light displayed in display of the remaining capacity of the memory in the control portion can be easily carried out.

In another example, the LCD display portion 8 is structured as shown in FIG. 12.

Figure 12A:
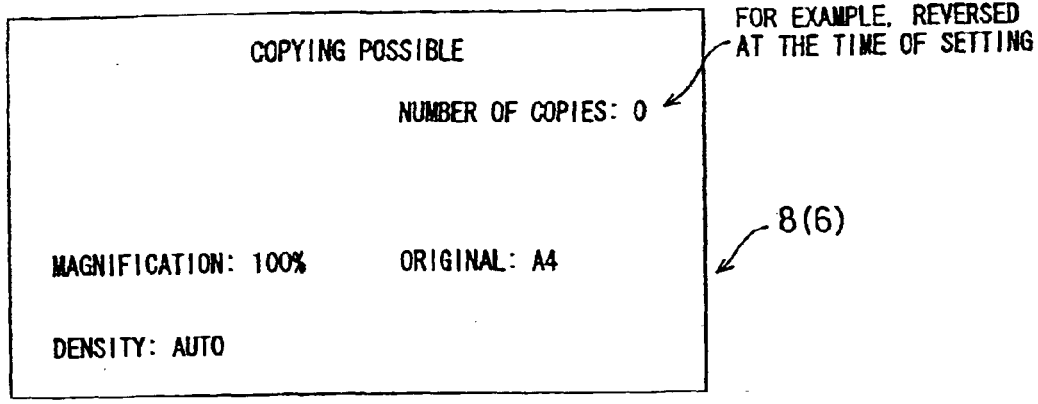
FIGS. 12A to 12C are plan views of the display portion in the third embodiment.

In this case, while the display area of the LCD display portion 8 is divided like in FIGS. 11B to 11D, the display method of the divisional areas is different. For example, when the number of copies is set, according to the conventional method, as shown in FIG. 12A, to show which number is set as the number of copies, the specified area is, for example, reversed.

However, in this example, since the LCD display portion 8 is divided, by displaying the back light of the target area so as to be different from the other areas, a display method with excellent visibility or viewability (visual sensitivity) can be provided.

Figure 12B:
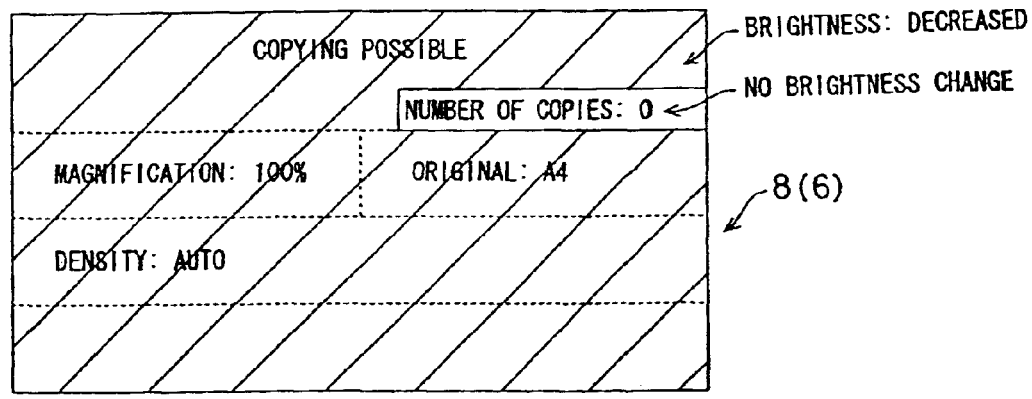
Figure 12C:
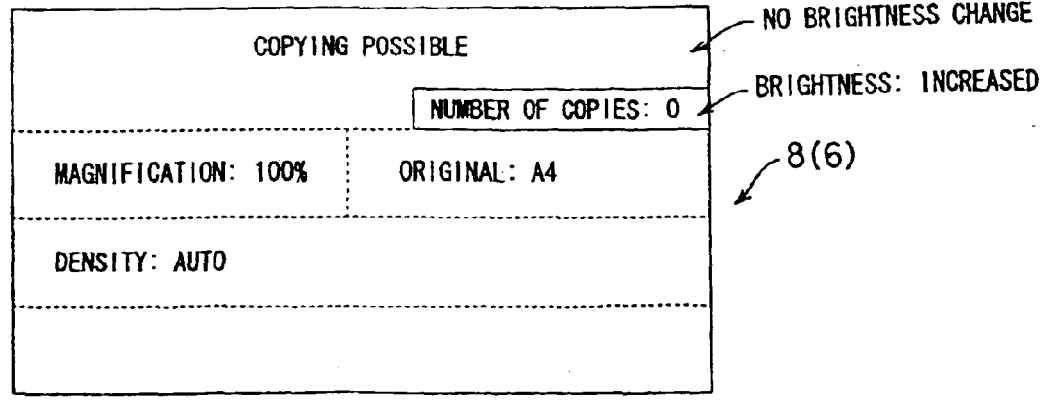

Specifically, by not changing the brightness of the target area and decreasing the brightness of the other areas like in FIG. 12B or by increasing only the brightness of the target area like in FIG. 12C, an effect of attracting the user's eyes (improvement in the degree of attraction) is produced, so that condition setting by the operation panel 6 (operation key portion 9) can be performed accurately.

Figure 13A:
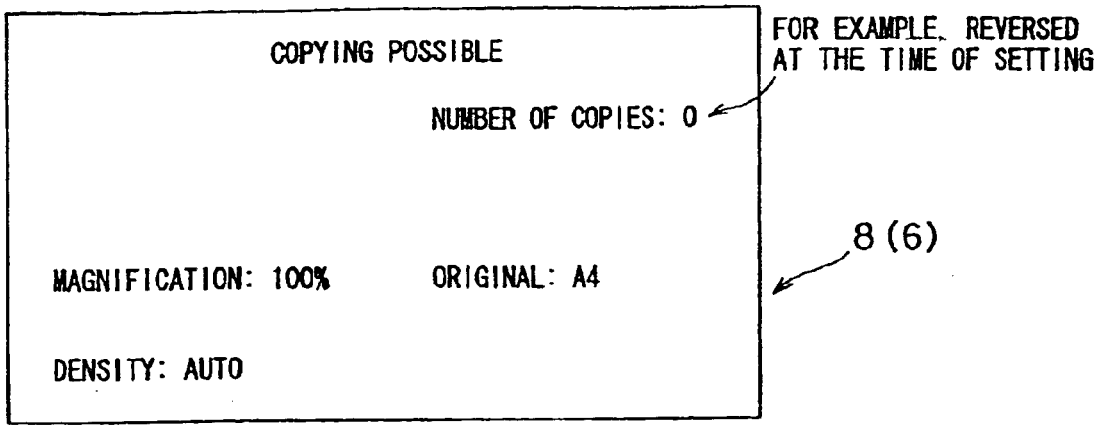
FIGS. 13A to 13C are plan views of the display portion in the third embodiment.
Figure 13B:
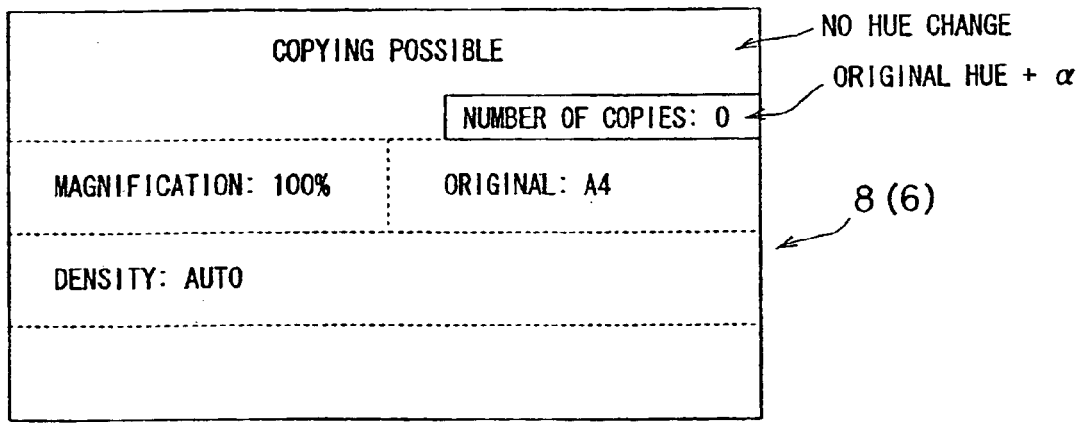
Figure 13C:
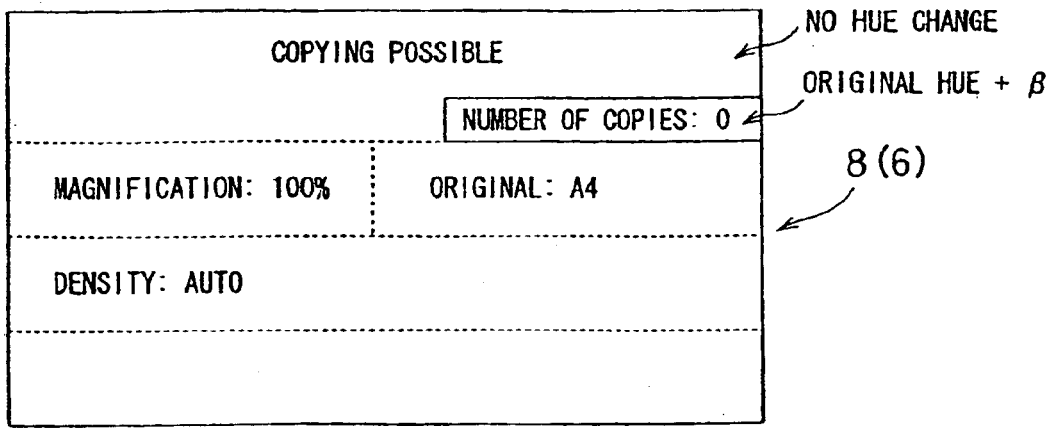

In a different example, the LCD display portion 8 is structured as shown in FIGS. 13A to 13C.

In this case, while the display area is divided like FIGS. 11B to 11D and FIGS. 12B to 12C, the display method of the divisional areas is different. For example, when the number of copies is set, according to the conventional method, as shown in FIG. 13A, to show which number is set as the number of copies, the specified area is, for example, reversed.

However, in this example, since the LCD display portion 8 is divided, by making the back light of the target area different from the other areas, a display method with excellent visibility or viewability (visual sensitivity) can be provided.

Specifically, only the hue of the target area is changed (by +α) in FIG. 13B, and after a predetermined time has elapsed, only the hue of the target area is further changed (by +β) in FIG. 13C. By making the changes of the hue in FIGS. 13B and 13C in fine steps, the target area can be displayed so that the hue changes by gradation (displayed stepwisely) (the above-mentioned area displayed so that the hue changes by gradation may be the areas other than the target area).

With this display, an effect of attracting the user's eyes (improvement in the degree of attraction) is produced, so that condition setting by the operation panel 6 (operation key portion 9) can be performed accurately.

By combining the method of FIGS. 13B and 13C with the methods shown in FIGS. 11B to 11D and FIGS. 12B to 12C or by enabling the user to select a method from among these display methods according to the use condition or the like, viewability (visual sensitivity) can be further improved.

As described above, various display conditions of the LCD display portion 8 can be realized. Further, by showing the condition of the apparatus (the current condition of progress of the processing, the list of the locations of trouble occurrences, the use condition of the consumables, the list of the charging systems, etc.) on the divisional areas of the LCD display portion 8, the user can grasp the condition of the apparatus at a glance only by viewing the LCD display portion 8.

FIGS. 14A to 14G show examples of displays provided on the LCD display portion 8 in the processing modes (the copying mode, the facsimile mode, the scanner mode, and the printer mode) in the image forming apparatus. Like these examples, the number of remaining recording sheets at that time in the copy mode, the remaining capacity of the memory and the size of the transmission original in the facsimile mode, display of the destination address in the scanner mode (used a selectronic mail), and the tray used and the number of remaining sheets in the tray in the printer mode can be displayed in the normal display condition of the LCD display portion 8.

Next, an image forming apparatus according to a fourth embodiment of the invention will be described in detail with reference to FIGS. 15 to 18.

First, a structure that changes the brightness of the back light in accordance with the change of the working condition and the operation condition of the apparatus will be described with reference to the circuit diagram of FIGS. 15A and B.

A sensor 1 is, for example, a sensor in which a condition change occurs by a person approaching the sensor. For example, when detecting that a person (operator) is near the image forming apparatus, the sensor 1 transmits a back light ON signal to the CPU. In response thereto, the back light color of the LCD display portion 8 of the operation panel 6 is changed.

The display color can be changed by controlling the turning on/off of the back light of the LCD display portion 8. That is, the LCD display portion 8 comprises light emitting diodes (LEDs), and the turning on/off of the LEDs is controlled by selecting an LED to be turned on (selecting the display color corresponding to the working condition and the operation condition of the apparatus) in accordance with a signal output from the central processing unit CPU to an integrated circuit IC 2.

More specifically, by transmitting a signal from the integrated circuit IC 2 to the LEDs by way of control circuits 1 to 8 having different resistance values, the LEDs 1 to 8 are turned on/off, and by outputting the signal from the central processing unit CPU to the integrated circuit IC 1, the brightnesses of the LEDs 1 to 8 are adjusted. That is, each control circuit comprises a transistor TR and a resistor R1. A collector terminal of the transistor TR is electrically connected to the resistor R1. A emitter terminal of the transistor TR is grounded. By outputting the signals of the integrated circuit IC 1 and the integrated circuit IC 2 to the control circuits 1 to 8, the voltage level corresponding to the brightness selected by the integrated circuit IC 1 is adjusted, and the LEDs selected by the integrated circuit IC 2 are turned on at the adjusted brightness.

The brightnesses of the LEDs selected in the above-described manner are obtained by controlling ON/OFF of the signals as shown in the tables in FIGS. 15C and 15D. For example, in FIG. 15C, when an input signal 1 is ON (1=ON) and an input signal 2 is OFF (0=OFF), the brightness is adjusted by an output 3. In FIG. 15D, for example, when an input signal A is ON, an input signal B is OFF and a signal C is ON, an output ⑥ is selected, and a signal is transmitted to the LED corresponding to the output ⑥.

Figure 16:
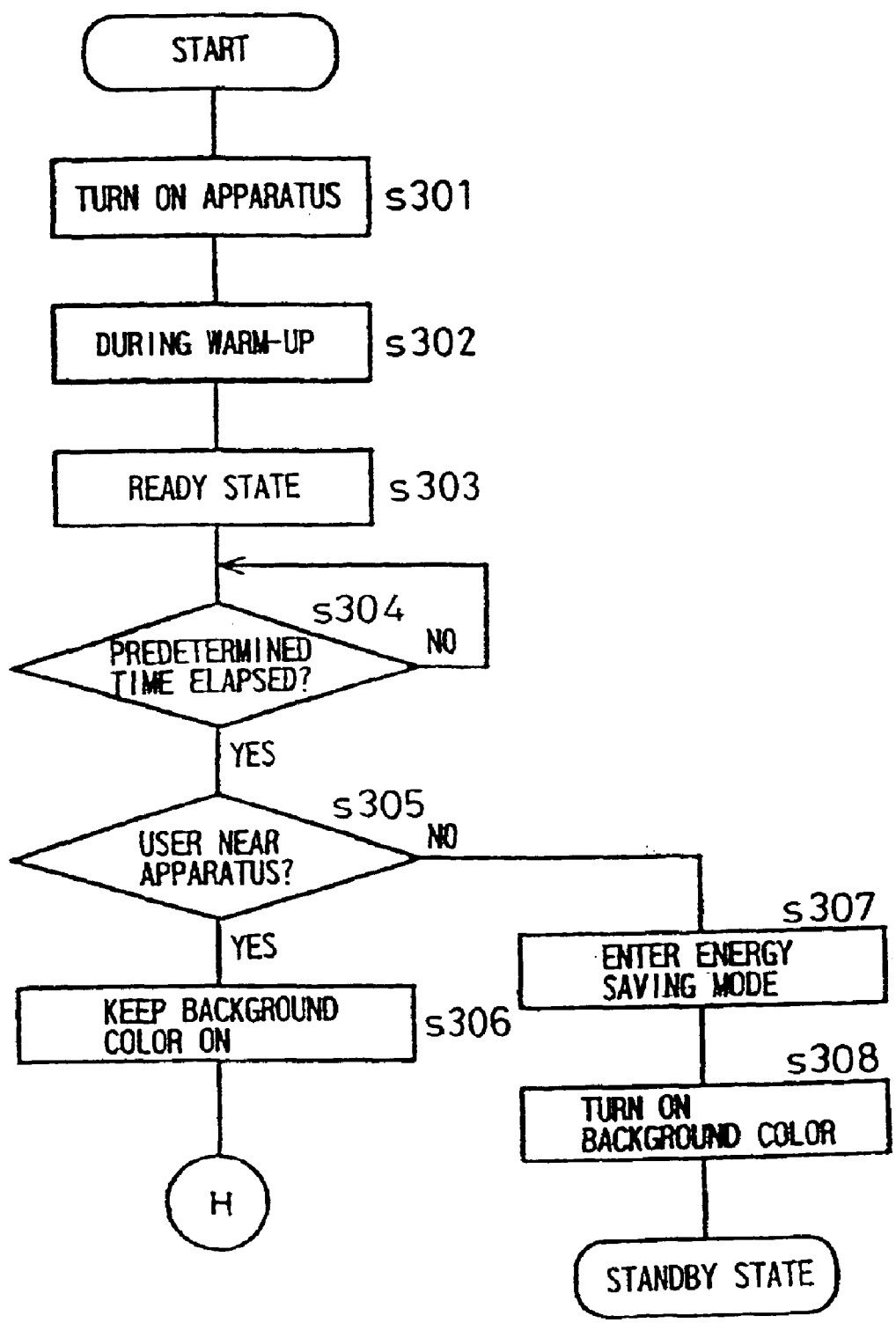
FIG. 16 is apart of a flowchart for explaining a processing procedure in the fourth embodiment.
Figure 17:
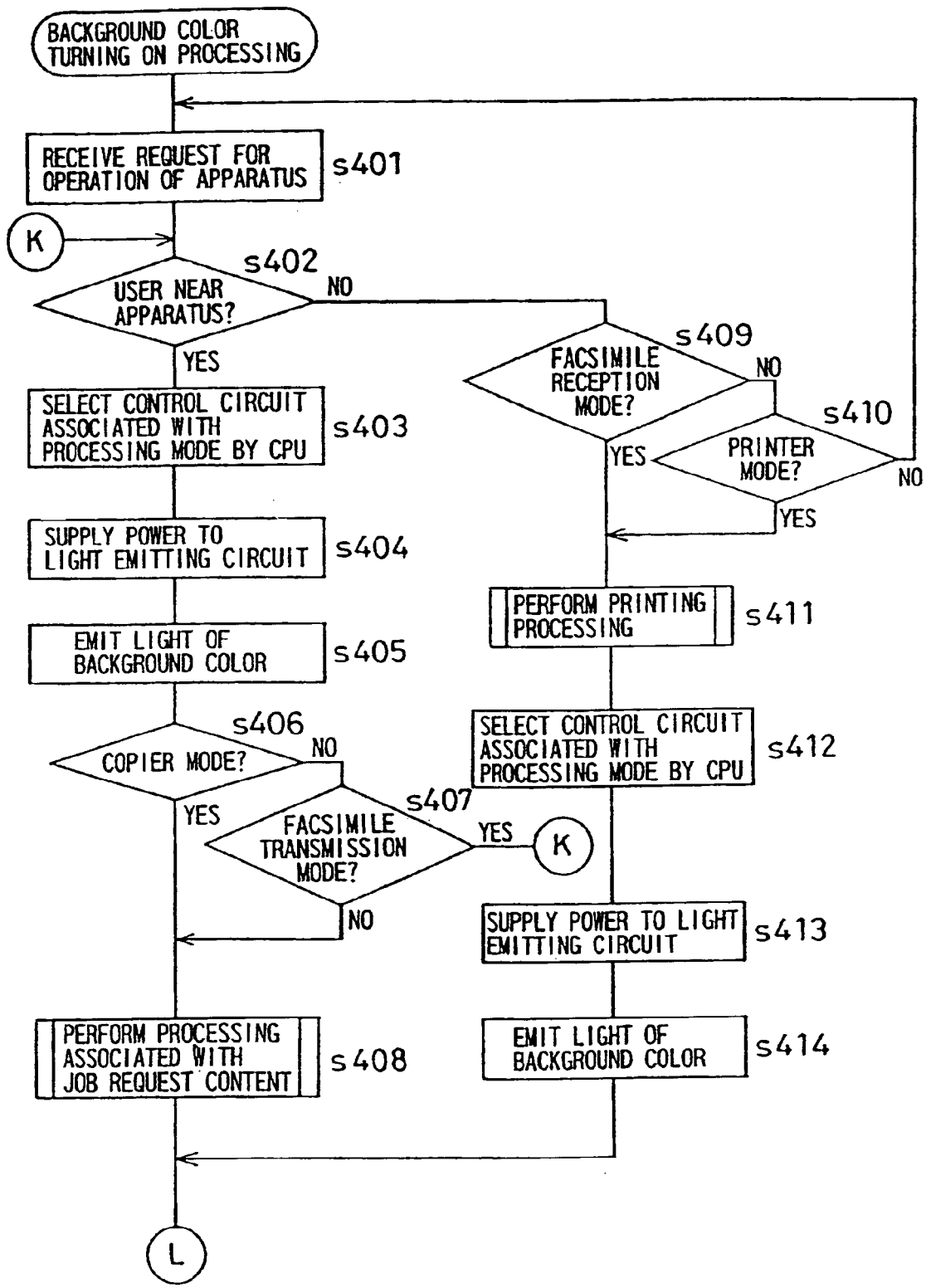
FIG. 17 is another part of the flowchart.

Next, the flows of operation processings will be described with reference to FIGS. 16 to 18.

First, a background color (back light color) turning off processing (shift to the energy saving mode) will be described with reference to FIG. 16. By the user turning on the apparatus at step s301, a warm-up processing is performed at step s302. When the warm-up processing is finished, the process proceeds to step s303 and the apparatus enters the ready state. In this state, the brightness of the back light is changed stepwise in accordance with the stage of the ready state so that not only the processing mode that is on but also the step of the processing can be recognized by the change of the brightness of the back light.

After a predetermined time has elapsed at step s304, at step s305, whether the user is near the apparatus or not is determined. When the user is near the apparatus, the background color is kept on (step s306). When the user is not near the apparatus, the process shifts to the energy saving mode at step s307, and the background color is turned off (step s308). With this processing, the power consumed by the apparatus can be further reduced. For turning off the background color, after the predetermined time at step s304 is counted after the processing mode is finished, the processing from step s305 is performed similarly.

A background color turning on processing will be described with reference to FIG. 17. When the user is near the apparatus after a request for an operation is received at step s401, since it is determined that the user intends to perform copying or facsimile transmission, the control circuit associated with the processing mode is selected by the CPU (step s403), power is supplied to the selected light emitting circuit (step s404), light of the background color is emitted (step s405), and then, it is determined whether the set mode is the copier mode or not (step s406). In the case of the copier mode, the processing corresponding to the content of the job request is performed (step s408). When the set mode is not the copier mode at step s406, whether the set mode is the facsimile mode or not is determined. When the set mode is the facsimile mode, the process shifts to step s402.

When the user is not near the apparatus after the request for an operation is accepted at step s402, it can be presumed that the user uses the printer or performs facsimile reception. Therefore, to provide a warning that data is present, after the job processing (printing processing) at step s411 is finished, the background color is turned on (step s412 to step s414). With this processing, like the above-described processing, the power consumed by the apparatus can be further reduced.

Figure 18:
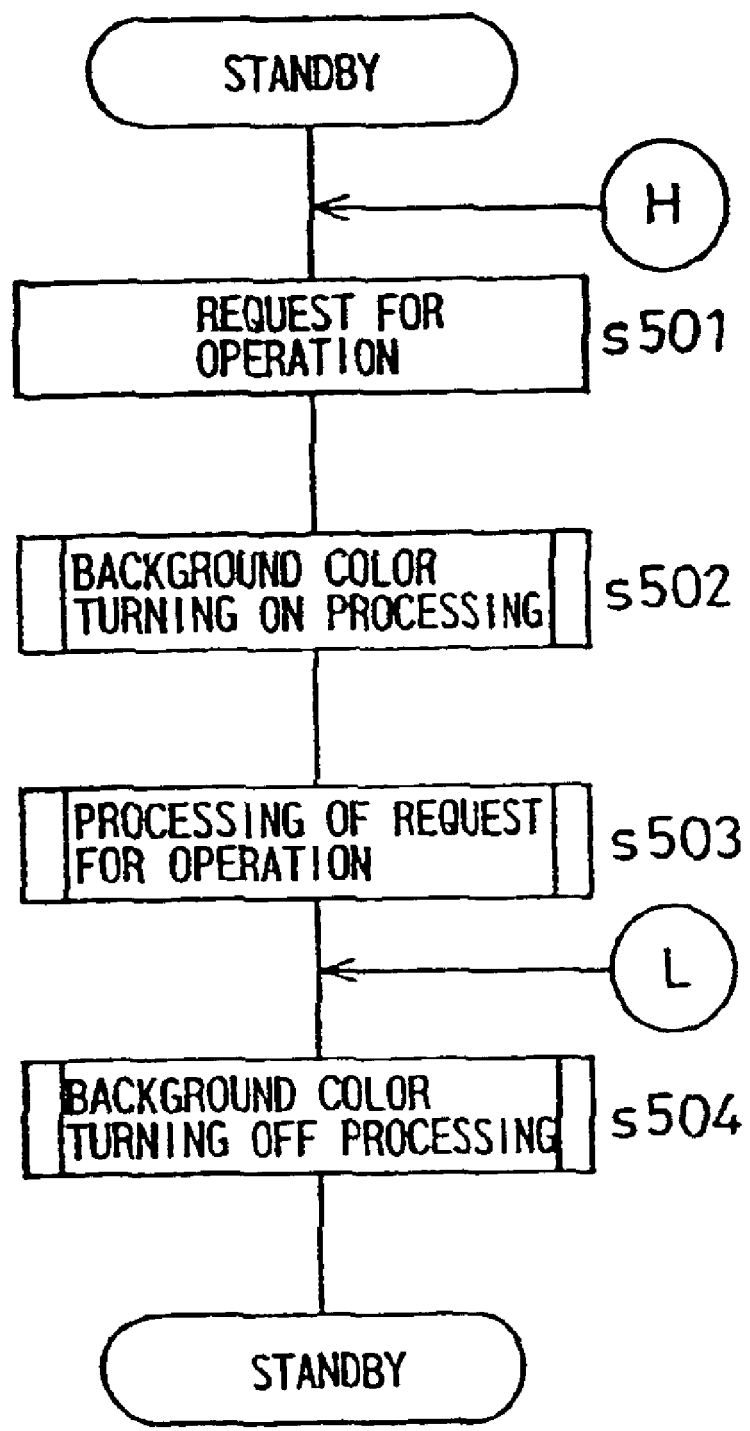
FIG. 18 is the remaining part of the flowchart.

The job processing is performed as shown in FIG. 18. That is, when a request for an operation is made at step s501, a background light turning on processing at step s502 is performed. After the background color turning on processing, at step s503, the content of the request for the operation from the user is recognized and the processing is performed. After the processing of the request for the operation is finished, the background color turning off processing at step s504 is performed, and the apparatus enters the standby state.

As described above, according to this embodiment, by the method of changing the brightness of the back light and by efficiently turning on and off the back light element, the power consumption is reduced, so that the degree of energy saving can be further increased. Moreover, by displaying the information that the user wants to obtain in a visually easy-to-recognize manner when the operation status of the compound apparatus is displayed, the condition change of the apparatus can be confirmed at a glance, so that the user convenience improves.

Next, an image forming apparatus according to a fifth embodiment of the invention will be described in detail with reference to FIGS. 19 to 21.

First, a technique for changing the back light in accordance with the change of the processing mode of the apparatus will be described with reference to the lab color model view of FIG. 19. The lab color is formed of brightness or lightness components (L), components in a range from green to red (a) and components in a range from blue to yellow (b).

First, an example in which a different hue is set for each processing mode will be described. FIG. 19 shows as an example colors representative of the processing modes and troubles so as to be allocated by use of the lab color model view. Describing as an example a compound apparatus having copier, scanner, printer and facsimile functions, C1 in the figure is a cyan and for the copier function, C2 is a purple and for the scanner function, C3 is a yellow and for the printer function, C4 is a light green and for the facsimile reception function, and C5 is a green and for the facsimile transmission function. As the color representative of an occurrence of a trouble, the red of C5 is used.

The colors used are largely different in lab coordinate value, and similar hues are never used. This enables the user to immediately recognize the operating status of the apparatus when the user recognizes the color of the operation panel in consideration of the lab coordinates. TABLE 3 shows lab coordinate values as an example.

TABLE 3

| Symbol in figure | Function | L | a | b |
| --- | --- | --- | --- | --- |
| C1 | Copier | 50.0 | −14.9 | −40.7 |
| C2 | Scanner | 50.0 | 15.8 | −28.6 |
| C3 | Printer | 90.0 | −10.0 | 71.5 |
| C4 | Facsimile reception | 90.0 | −70.0 | 90.0 |
| C5 | Facsimile transmission | 50.0 | −42.2 | 16.5 |
| C6 | Trouble | 50.0 | 50.2 | 25.5 |

While in the description given above, changes of the hue in the processing modes and when a trouble occurs are described as an example, by changing the hue within approximate coordinate values in accordance with the condition such as while the apparatus is operating, at the time of operation programming or at the time of condition setting, the user can recognize not the change of the processing mode but the change of the processing condition as well.

Taking the copier mode as an example, while the apparatus is operating, the back light color is blue (L=50), at the time of operation programming, the back light color is ice-blue or light blue (L=100), and at the time of condition setting, the back light color is dark blue (L=20), whereby the processing mode and the working condition can be recognized by changing the hue within the same kind of color according to the working condition, so that operability improves.

Figure 19:
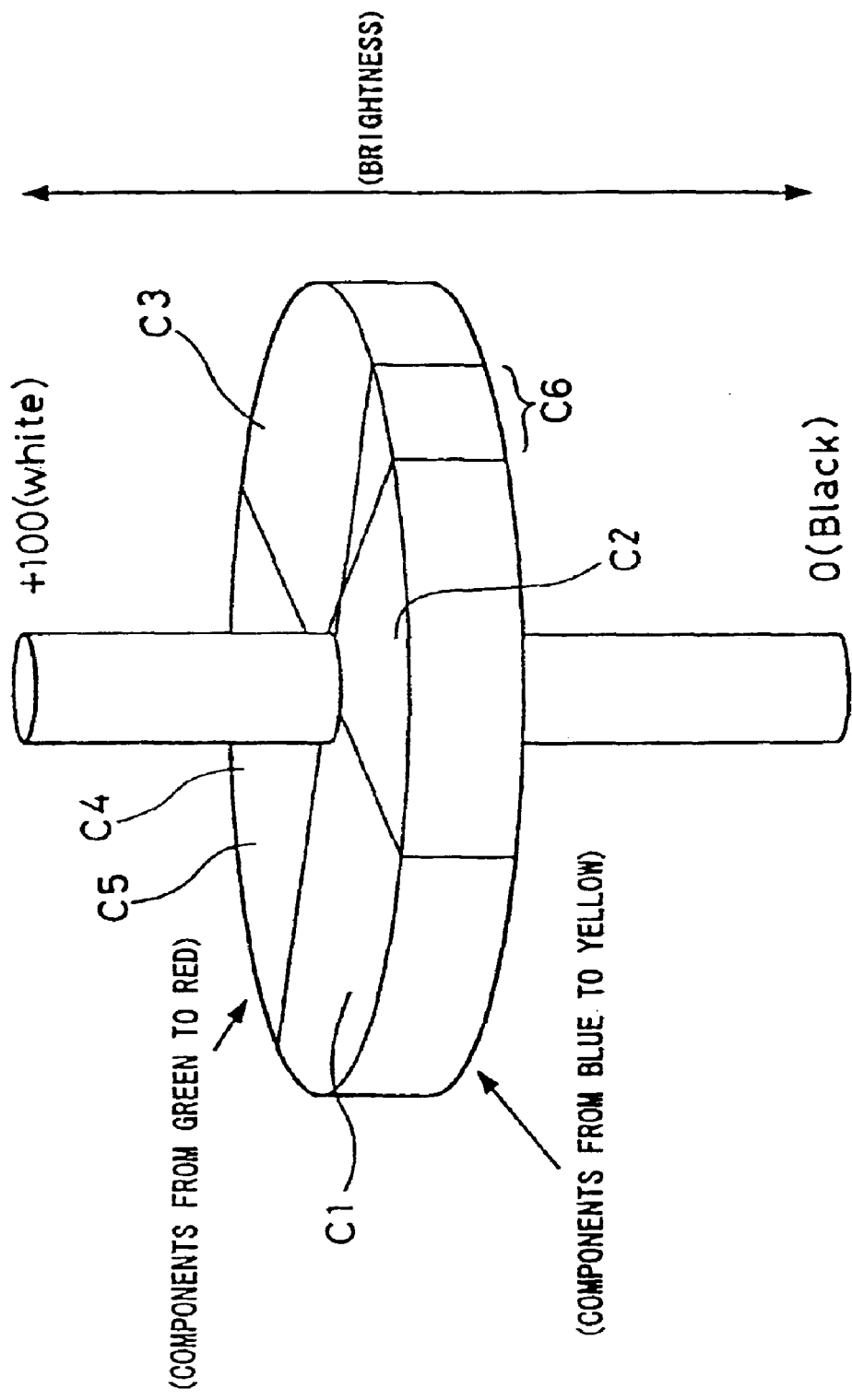
FIG. 19 is an explanatory view of a lab color for explaining the back light color of an image forming apparatus according to a fifth embodiment of the invention.

Aside from the working condition of the apparatus at that time, for a processing situation requiring immediate attention like paper jam in the image forming portion 200 or the sheet conveyance portion 300 of FIG. 1 with respect to processing situations in each processing mode, by setting the same back light hue as the hue representative of such a processing situation for all the processing modes, that is, setting the red of C5 shown in FIG. 19 as the hue, the processing to handle the trouble can be finished reliably and quickly.

As another example, for the contents of setting of the back light color of each processing mode, various setting contents corresponding to the multi-access time of the compound apparatus will be described with reference to the flowcharts of FIGS. 20 and 21A to 21D. Like in the above-described example, in recognizing various modes of the apparatus, the compound apparatus is provided with the facsimile function, the scanner function and the printer function in addition to the copier function.

First, by the user turning on the apparatus at step s601, initialization of the apparatus is performed at step s602, and when the initialization is finished, the process proceeds to step s603. At step s603, the apparatus is idle, and the process proceeds to step s604 to wait for a request for an operation of the apparatus or a change of the condition of the apparatus. When there is a request for an operation, the content of the request is assigned. When there is no request, the apparatus waits for a request for an operation or a condition change while remaining idle.

The content of the request for the operation from the user is recognized, and determination of the content of the setting of various conditions is finished, the back lights of the other modes (the scanner mode, the printer mode, and the facsimile mode) are turned off at step s614, the back light color representing that the request is being processed is displayed at step s615, and the process proceeds to step s616 to perform the processings of parts associated with the copier processing. Then, the process is ended.

When the processing portion that performs copying is unusable at step s611, as an example, whether or not an interrupt of a copier processing is applicable to the current job (for example, while the printer function is being used) is determined based on relationship shown in TABLE 4 at step s617. When the interrupt is possible, at step s618, the current job is temporarily suspended, the back light color representing that an interrupt of a copier processing is possible is displayed, the processings of parts associated with the copier processing are performed, and the process is ended. When the interrupt is impossible, at step s619, the back light representing that the copy mode cannot be accepted is displayed, and the process is ended.

TABLE 4

| | | | | Interrupt | | | | |
|---|---|---|---|---|---|---|---|---|
| Current | | Copier | Scanner | Printer | Facsimile reception | Facsimile transmission | When there is no interrupt | At the time of setting |
| Copier | | x | x<br>Color E | Δ<br>Color C3 | Δ<br>Color D3 | Δ<br>Color D6 | ⊚<br>Color A1 | ⊚<br>Color A2 |
| Scanner | | x<br>Color E | x | Δ<br>Color C3 | Δ<br>Color D3 | x<br>Color E | ⊚<br>Color B1 | ⊚<br>Color B2 |
| Printer | | ○<br>Color A3 | ⊚<br>Color B1 | x | Δ<br>Color D3 | ⊚<br>Color D4 | ⊚<br>Color C1 | ⊚<br>Color C2 |
| Facsimile reception | During reception | ○<br>Color A3 | ⊚<br>Color B1 | ⊚<br>Color C1 | x | x<br>Color E | ⊚<br>Color D1 | ⊚<br>Color D2 |
| | During printing | ○<br>Color A3 | x<br>Color E | Δ<br>Color C3 | x | ⊚<br>Color D4 | | |
| Facsimile trans-mission | During transmission | ⊚<br>Color A1 | ⊚<br>Color B1 | ⊚<br>Color C1 | x<br>Color E | x | ⊚<br>Color D4 | ⊚<br>Color D5 |
| | During reading | x<br>Color E | x<br>Color E | ⊚<br>Color C1 | ⊚<br>Color D1 | x | | |

○: Interrupt. Job is executed after current job is suspended.
Δ: Program. Job is executed after current job is finished.
x: Unusable.

request for the operation is performed at step s605 to step s609. When the content of the request is the copier mode, the process proceeds to step s605. When the content is the scanner mode, the process proceeds to step s606. When the content is the printer mode, the process proceeds to step s607. When the content is the facsimile reception mode, the process proceeds to step s608. When the content is the facsimile transmission mode, the process proceeds to step s609. A request that does not apply (step s610) is ignored and the process is ended.

At step s611 in the case of the copier mode, whether the processing portion that performs copying is usable or not is determined. When the processing portion is usable, the process proceeds to step s612. When the processing portion is unusable, the process proceeds to step s617. First, a case where the processing portion is usable will be described.

Setting of conditions of copier mode is repeated until completion of the setting is recognized at step s312. When With reference to FIGS. 20 and 21A, at step s620 in the case of the scanner mode, whether the processing portion that performs scanning is usable or not is determined (this is because when a function not using the original table 7 of FIG. 1 is on like in the printer mode, the printer mode and the scanner mode can-be processed in parallel). When scanning is possible, the process proceeds to step s612 to set various processings associated with the scanner mode. When scanning is impossible, the back light representing that the scanner mode cannot be accepted is displayed at step s621. Then, the process is ended.

Figure 20:
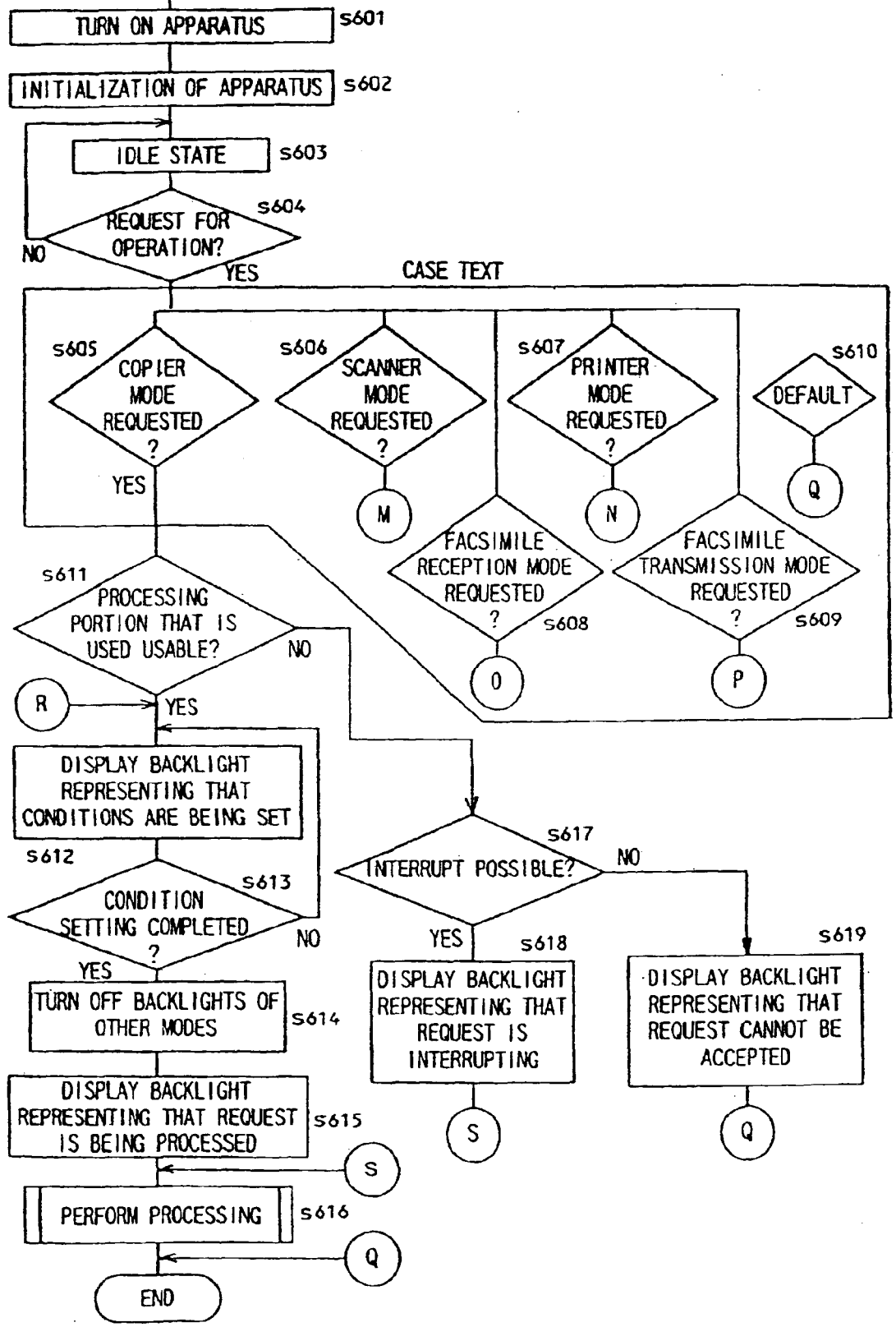
FIG. 20 is a part of a flowchart for explaining a processing procedure in the fifth embodiment.
Figure 21:
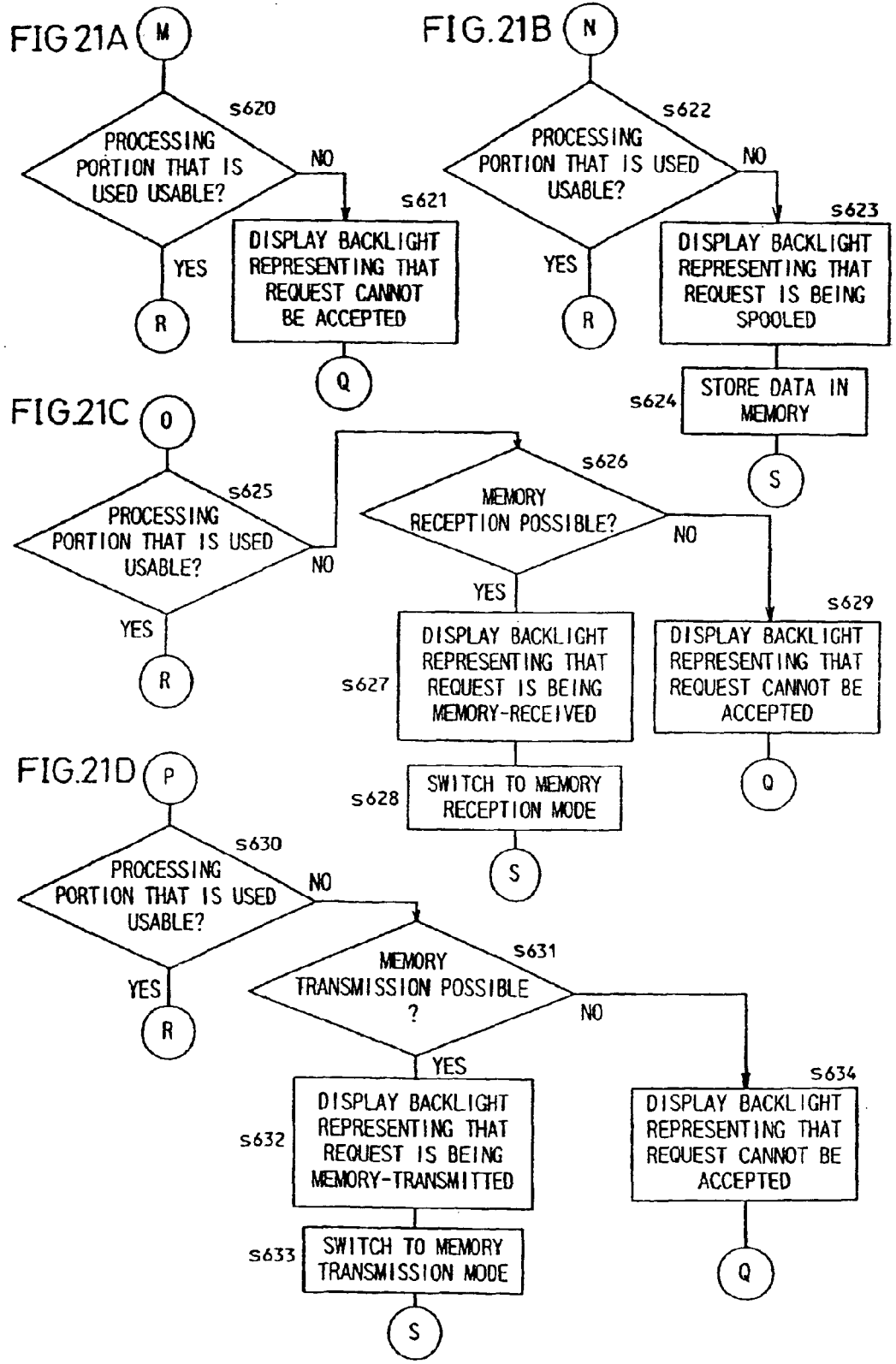
FIGS. 21A to 21D are the flowchart for each mode.

With reference to FIGS. 20 and 21B, at step s622 in the case of the printer mode, whether the processing portion that performs printing is usable or not is determined. When printing is possible, the process proceeds to step s612 to set various processings associated with the printer mode. When printing is impossible, a back light color representing that printer data is being spooled is displayed at step s623, the received printing data is stored in a memory at step s624, and the processings of parts associated with the printer mode are performed. Then, the process is ended.

With reference to FIGS. 20 and 21C, at step s625 in the case of facsimile reception, whether the image forming portion 200 of FIG. 1 or the like that prints the received facsimile is usable or not is determined (this is because in the case of facsimile reception, it is possible to temporarily store the received facsimile in a memory without immediately printing the received facsimile and print the stored facsimile later). When the image forming portion 200 or the like is usable, the process proceeds to step s612 to perform the processings of parts associated with facsimile reception. Then, the process is ended.

When the image forming portion 200 or the like is unusable, whether memory reception is possible or not is determined at step s626. When memory reception is possible, a back light color representing that memory reception is in progress is displayed at step s627, and after the facsimile mode is switched to the memory reception mode at step s628, the process proceeds to step s616 to perform the processings of parts associated with facsimile memory reception. Then, the process is ended. When memory reception is impossible, the back light representing that the facsimile reception mode cannot be accepted is displayed. Then, the process is ended.

Lastly, with reference to FIGS. 20 and 21D, at step s630 in the case of facsimile transmission, whether a communication portion (not shown in FIG. 1) or the like that performs facsimile transmission is usable or not is determined. When the communication portion or the like is usable, the process proceeds to step s612 to perform the processings of parts associated with facsimile transmission. Then, the process is ended. When the communication mode or the like is unusable, whether memory transmission is possible or not is determined at steps 631. When memory transmission is possible, the back light color representing that memory transmission is in progress is displayed at step s627, and after the facsimile transmission mode is switched to a memory transmission mode at step s628, the process proceeds to step s616 to perform the processings of parts associated with facsimile memory transmission. Then, the process is ended. When memory transmission is impossible, the back light representing that the facsimile transmission mode cannot be accepted is displayed. Then, the process is ended.

As described above, it is necessary to change the condition of the operation panel in accordance with the operation of the apparatus. In the case of compound apparatuses, for example, when the printer mode is on, facsimile transmission and facsimile memory reception are also possible. However, when such a situation is displayed on the LCD display portion 8, recognition of the characters displayed on the LCD display portion 8 is intricate.

Therefore, by setting the reference color of the back light corresponding to each processing mode (the printer mode, the copier mode, etc.) as described above and setting the hue as shown in TABLE 4, the user can immediately recognize the working condition of the apparatus when recognizing the color of the LCD display portion 8. When the apparatus is operating in one processing mode, by turning off the back lights of the other modes, the power consumed by the apparatus can be further reduced.

Next, an image forming apparatus according to a sixth embodiment of the invention will be described in detail with reference to FIGS. 22 to 29. In the sixth embodiment, display condition of the display portion is changed in accordance with the working condition of the temperature setting portion.

Figure 22:
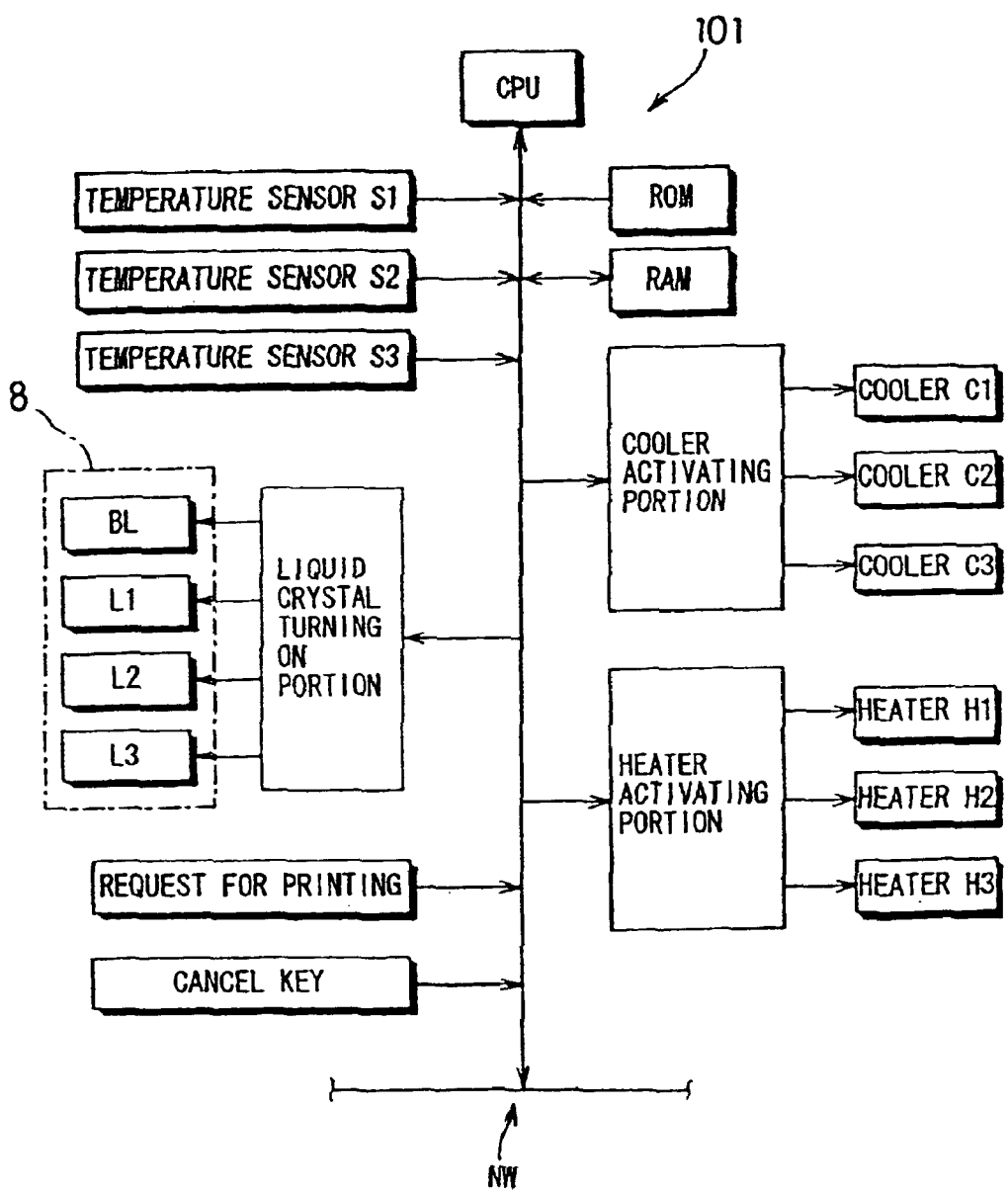
FIG. 22 is a control system diagram of a display condition control portion of an image forming apparatus according to a sixth embodiment of the invention.

The display condition controller 101 of the embodiment is shown in FIG. 22. To the input side of the display condition control portion 101 are connected (or input) a temperature sensor S1 disposed in the fixing means 23, a temperature sensor S2 disposed in the process portion (image forming portion) 200 and a temperature sensor S3 disposed in the scanner optical system 10 as temperature detecting means, and a printing request signal transmitted from the operation key portion 9 of the operation panel 6 or an external network and a cancel key provided on the operation panel 6.

To the output side of the display condition control portion 101 are connected a back light element BL, a fixing light element L1, a process light element L2 and an optical light element L3 disposed in the LCD display portion 8 of the operation panel 6, a cooler C1 and a heater H1 disposed in the fixing means 23, a cooler C2 and a heater H2 disposed in the process portion, a cooler C3 and a heater H3 disposed in the scanner optical system 10, and the like.

In this copier, with the display condition control portion 101, without the need to display characters or newly provide an operation button or the like, by controlling the conventionally used back light and liquid crystal character of the LCD display portion 8 of the operation panel 6, the structure is simpler than in the case where characters are displayed, and without the need for space, the LCD display portion 8 can be made compact and the working condition of the apparatus can be grasped from outside at a glance. The display condition control portion 101 may be provided in the above-described control portion.

[Description of Warm-up Mode]

Figure 23:
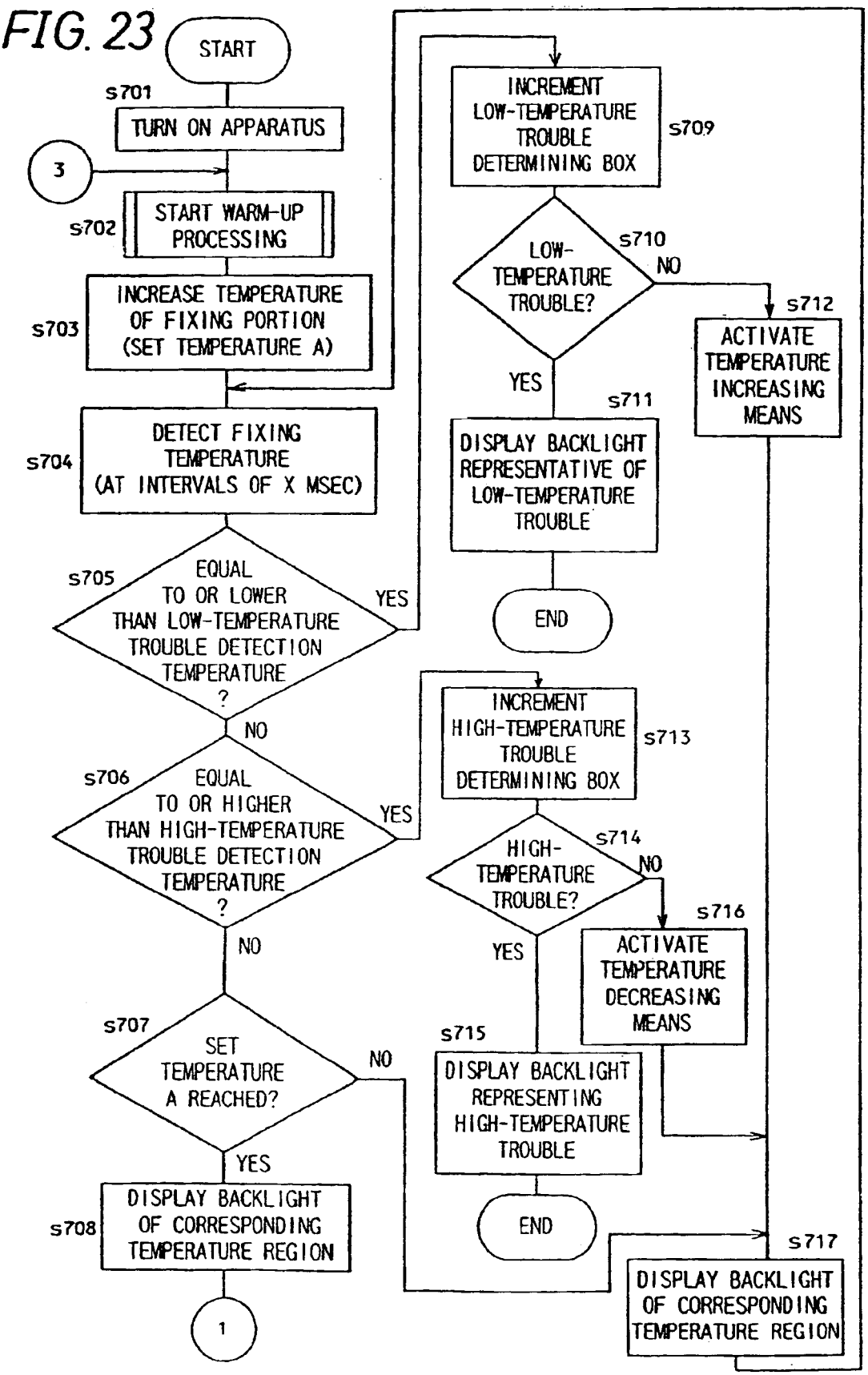
FIG. 23 is a flowchart showing a processing procedure of a warm-up mode in the sixth embodiment.

FIG. 23 shows a principal processing procedure associated with a warm-up mode and the fixing temperature in the initial state where the apparatus is turned on. With reference to this figure, the control flow of the warm-up mode with the fixing means 23 as an example will be described.

First, at step s701, by the turning on of the apparatus, the initialization of the apparatus is performed. Then, at step s702, the warm-up processing of the apparatus is started. When the warm-up processing is started, as shown in the temperature transition view of FIG. 27, the fixing temperature increases from room temperature to a set temperature A (step s703). Then, at step s704, the fixing temperature is detected at predetermined time intervals (for example, X msec) by the temperature detecting sensor disposed in the fixing means 23 (temperature sensor S1).

Based on the detected temperature, first, at step s705, whether or not the detected temperature is equal to or lower than a low-temperature trouble detection temperature is determined. The processing performed when a low-temperature trouble occurs will be described later. Further, at step s706, whether or not the detected temperature is equal to or higher than a high-temperature trouble detection temperature is determined. The processing performed when a high-temperature trouble occurs will be described later. A case will be described where no low-temperature or high-temperature trouble occurs and the apparatus is performing the warm-up processing normally.

At step s707, whether the fixing temperature which is a condition for finishing the warm-up processing reaches the set temperature A (see FIG. 27) or not is determined. When the set temperature A is not reached, the process returns to step s704. A case where the set temperature A is reached will be described.

Figure 29:
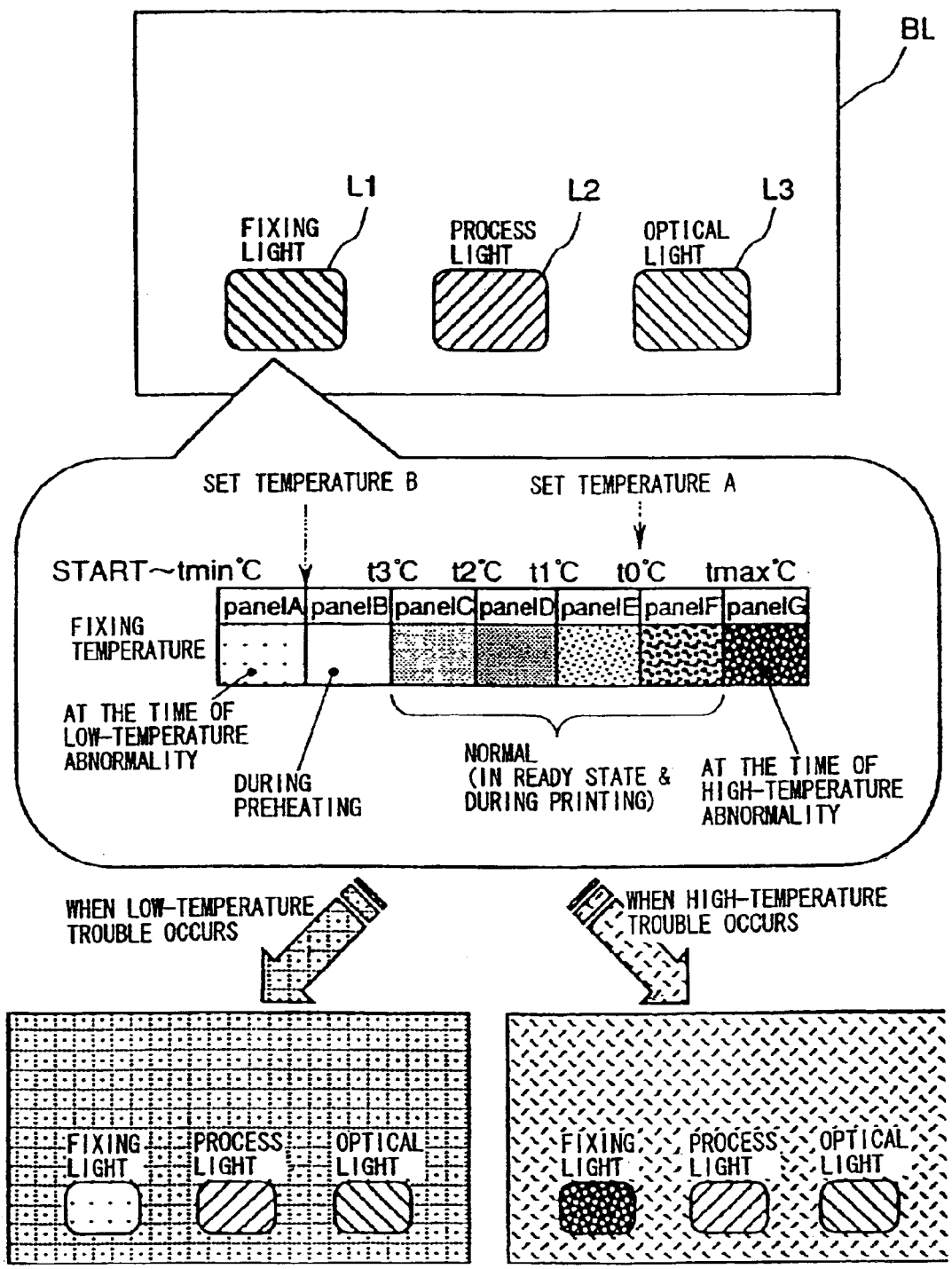
FIG. 29 is a view of display patterns of a back light of a display panel in the sixth embodiment.

When the temperature of the fixing means 23 reaches the set temperature A, at step s708, the back light (fixing light element L1) of a temperature range corresponding to the detected temperature, that is, a temperature range corresponding, for example, to panelF shown in FIG. 29 is turned on (displayed). After panelF is displayed, the warm-up processing is finished (step s801), and the apparatus enters the ready state (usable state) (step s802).

When the detected temperature is equal to or lower than the low-temperature trouble detection temperature at step s705, at step s709, the time at which the temperature equal to or lower than the low-temperature detection is detected is measured (for example, X msec×N1 times), and at step s710, it is determined whether or not a condition where the fixing temperature is equal to or lower than the low-temperature trouble detection temperature continues for a predetermined time to bring the apparatus into a low-temperature trouble state.

While the apparatus has not reached the low-temperature trouble, at step s712, means for promoting increase of the temperature of the fixing means 23 is activated (for example, the heaters H1 in the fixing rollers 23 of FIG. 1 are heated), at step s717, the back light (fixing light element L1) of a temperature range corresponding to the detected temperature, that is, a temperature range corresponding, for example, to panelA shown in FIG. 29 is displayed, and at step s704, the fixing temperature is again detected at predetermined time intervals (for example, X msec) by the temperature sensor S1 disposed in the fixing means 23.

Figure 25:
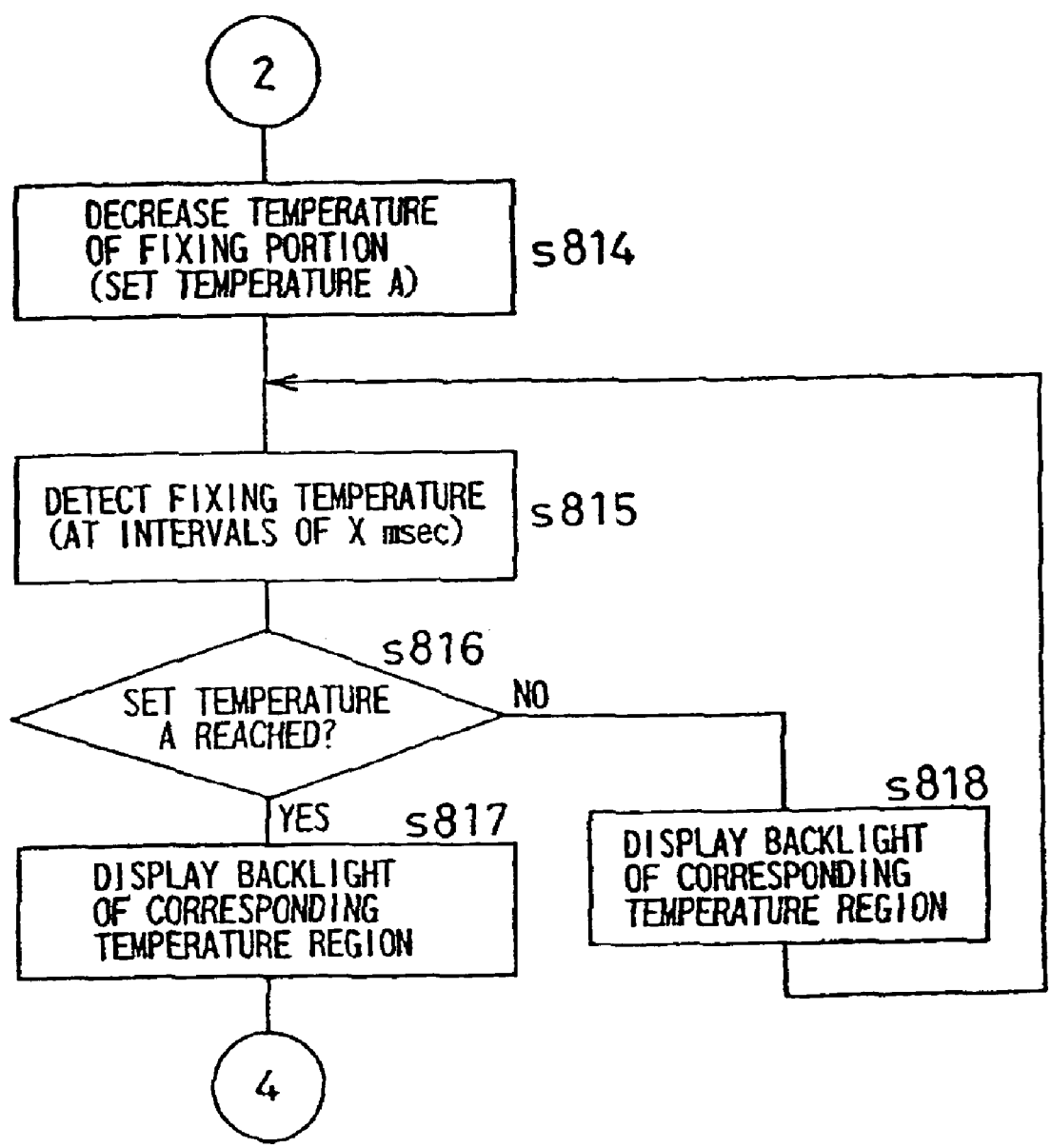
FIG. 25 is the remaining part of the flowchart showing the processing procedure of the standby mode in the sixth embodiment.

When the apparatus reaches the low-temperature trouble, at step s711, the back light BL is displayed so that the occurrence of the low-temperature trouble is indicated (see the display provided when a low-temperature trouble occurs shown in FIG. 25), and the apparatus is stopped.

When it is determined at step s706 that the detected temperature is equal to or higher than the high-temperature trouble detection temperature, at step s713, the time at which the temperature equal to or higher than the high-temperature detection is detected is measured (for example, X msec×N2 times), and at step s714, it is determined whether or not a condition where the fixing temperature is equal to or higher than the high-temperature trouble detection temperature continues for a predetermined time to bring the apparatus into a high-temperature trouble state.

While the apparatus has not reached the high-temperature trouble, at step s716, means for promoting decrease of the temperature of the fixing means 23 (for example, the coolers C1 for cooling the heaters S1 in the fixing rollers 23) is activated, and at step s717, the back light (fixing light element L1) of a temperature range corresponding to the detected temperature, that is, a temperature range corresponding, for example, to panelG shown in FIG. 29 is displayed, and at step s704, the fixing temperature is again detected at predetermined time intervals (for example, X msec) by the temperature sensor S1 disposed in the fixing means 23.

When the apparatus reaches the high-temperature trouble, the back light BL is displayed so that the occurrence of the high-temperature trouble is indicated (see the example of the display provided when a high-temperature trouble occurs shown in FIG. 25), and the apparatus is stopped.

As described above, when the detected temperature of the fixing means 23 is neither equal to or lower than the low-temperature trouble detection temperature nor equal to or higher than the high-temperature trouble detection temperature, whether the fixing temperature which is a condition for finishing the warm-up processing reaches the set temperature A or not is determined at step s707, and when the set temperature A is not reached, the process shifts to step s716. At step s717, the back light (fixing light element L1) of a temperature range corresponding to the detected temperature, that is, a temperature range corresponding, for example, to panelB to panelE shown in FIGS. 29 is displayed, and at step s704, the fixing temperature is again detected at predetermined time intervals (for example, X msec) by the temperature sensor S1 disposed in the fixing means 23.

[Description of Standby Mode]

Figure 24:
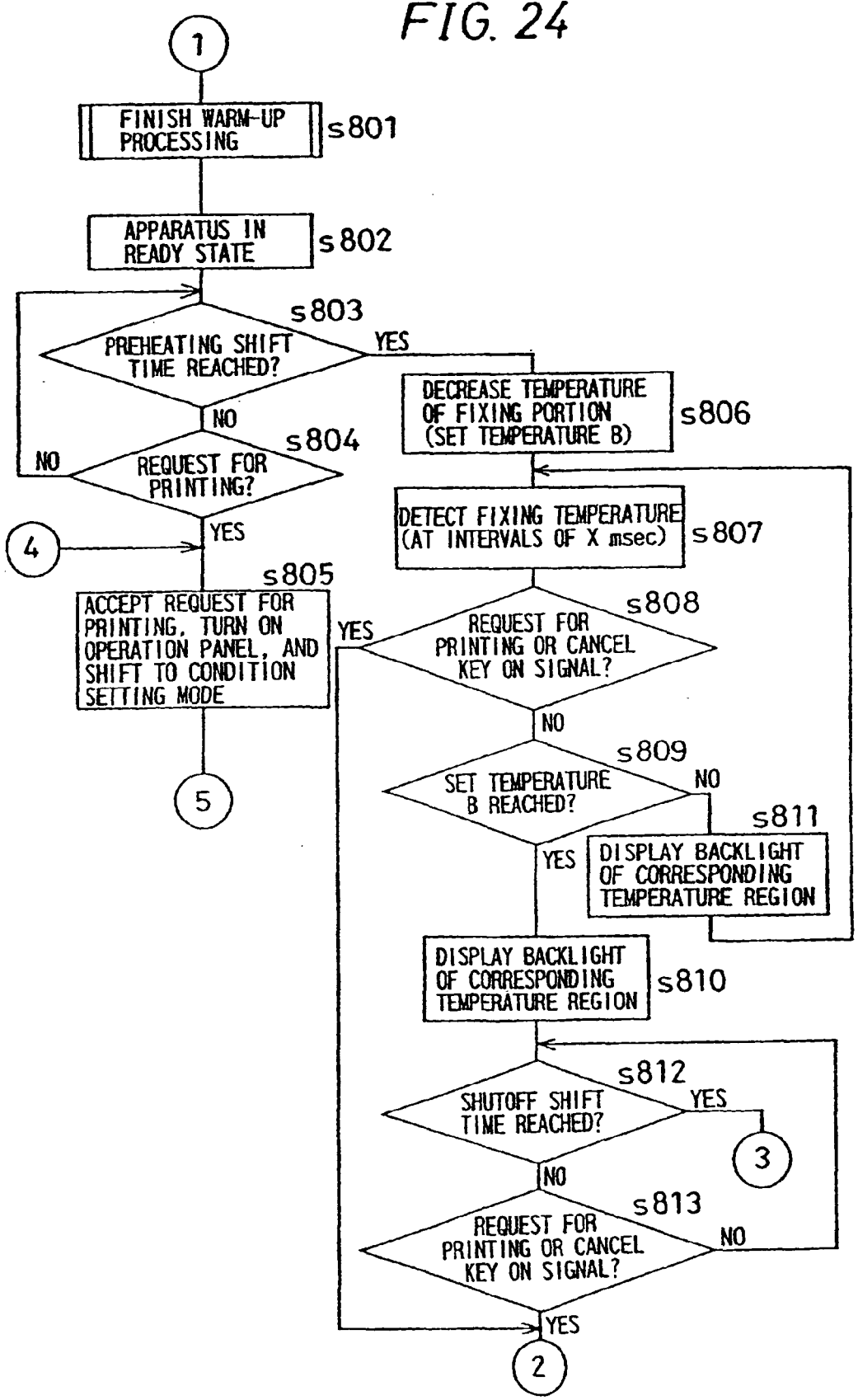
FIG. 24 is a part of a flowchart showing a processing procedure of a standby mode in the sixth embodiment.

Next, the standby state from the finish of the warm-up processing to the acceptance of a request for printing will be described with reference to the flowcharts of FIGS. 24 and 25. First, when the warm-up processing is finished at step s801, the apparatus shifts to the ready state at step s802. The apparatus is in the standby state until accepting a request for printing in the ready state.

At step s803, whether the standby state reaches a preheating shift time or not is determined. A case will be described where a request for printing is accepted under a condition where the standby state has not reached the preheating shift time.

Whether there is a request for printing or not is determined at step s804. When there is a request for printing, at step s805, the request for printing is accepted, the LCD display portion 8 of the operation panel 6 is turned on, and the process shifts to a condition setting mode.

Figure 27:
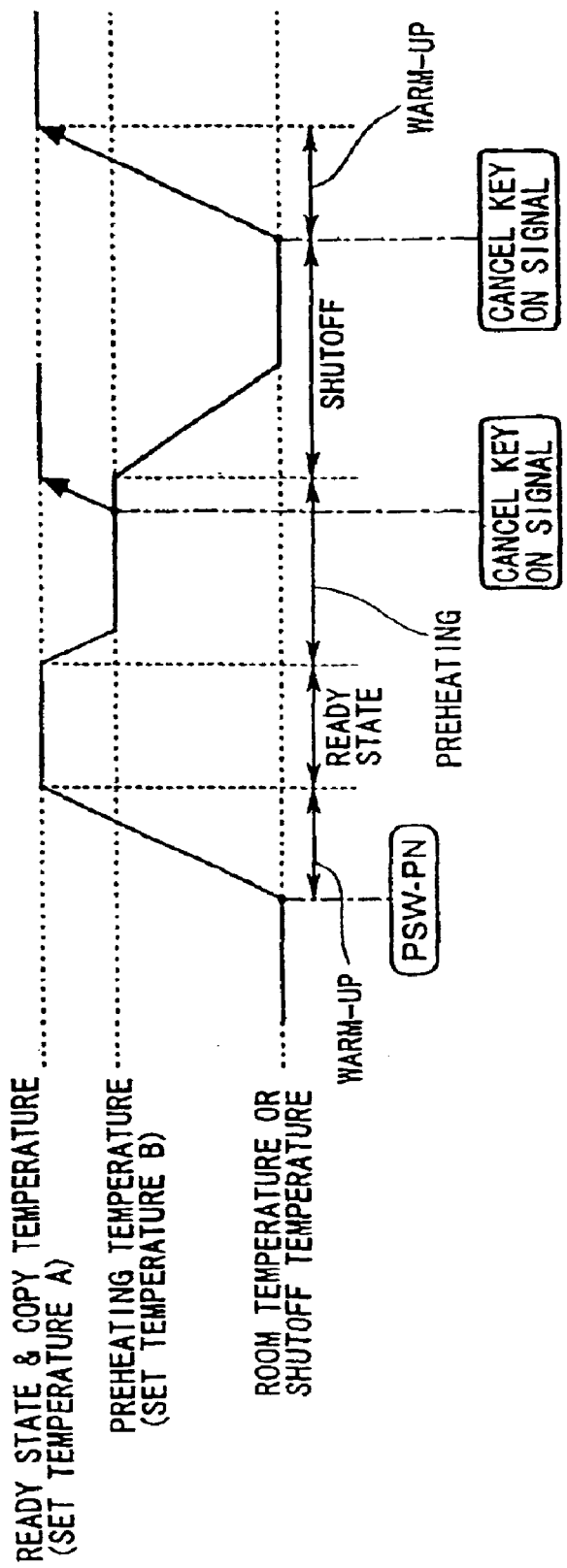
FIG. 27 is a temperature transition view in the sixth embodiment.

When it is determined at step s803 that the standby state reaches the preheating shift time, as shown in FIG. 27, the fixing temperature decreases from the ready state (set temperature A) to a set temperature B (step s806). At step s807, the fixing temperature is detected at predetermined time intervals (for example, X msec) by the temperature sensor S1 disposed in the fixing means 23.

Then, at step s808, whether or not a request for printing or a cancel key ON signal is accepted is determined. When a request for printing or a cancel key ON signal is accepted, the process shifts to a printing acceptance mode from step s814. Step s814 will be described later.

When neither a request for printing nor a cancel key ON signal is accepted, the following determination is repeated until the fixing temperature reaches the set temperature B: At step s809, whether the fixing temperature reaches the set temperature B or not is determined.

When the set temperature B is not reached, the process proceeds to step s811 to display the back light (fixing light element L1) of a temperature range corresponding to the detected temperature, that is, a temperature range corresponding, for example, to panelF to panelC shown in FIG. 29, and at step s807, the fixing temperature is again detected at predetermined time intervals (for example, X msec) by the temperature sensor S1 disposed in the fixing means 23.

The above-described determination is repeated until the fixing temperature reaches the set temperature B. When the fixing temperature reaches the set temperature B, at step s810, the back light (fixing light element L1) of a temperature range corresponding to the detected temperature, that is, a temperature range corresponding, for example, to panelB shown in FIG. 29 is displayed. After the back light is turned on, the apparatus is again in the standby state until a request for printing or a cancel key ON signal is accepted.

Then, at step s812, whether the standby state reaches a shutoff shift time or not is determined. When the standby state reaches the shutoff shift time, as shown in FIG. 27, the temperature control of the fixing means 23 is not performed until a request for printing or a cancel key ON signal is accepted. When a request for printing or a cancel key ON signal is accepted, the process shifts to step s701 of FIG. 23 to restart the warm-up processing.

When a request for printing or a cancel key ON signal is accepted before the standby state reaches the shutoff shift time, the process shifts to the printing acceptance mode from step s814. At step s814, as shown in FIG. 27, the fixing temperature increases up to the set temperature A. At step s815, the fixing temperature is detected at predetermined time intervals (for example, X msec) by the temperature sensor S1 disposed in the fixing means 23. As described above, the temperature increases until reaching the set temperature A, and the back light (fixing light element L1) of a temperature range corresponding to each detected temperature is displayed. When the set temperature A is reached, the back light (fixing light L) of a temperature range corresponding, for example, to panelF shown in FIG. 29 is displayed. After the back light is displayed, at step s805, a request for printing is accepted, the operation panel 6 is turned on, and the process shifts to the condition setting mode.

[Description of Printing Processing Mode]

Figure 26:
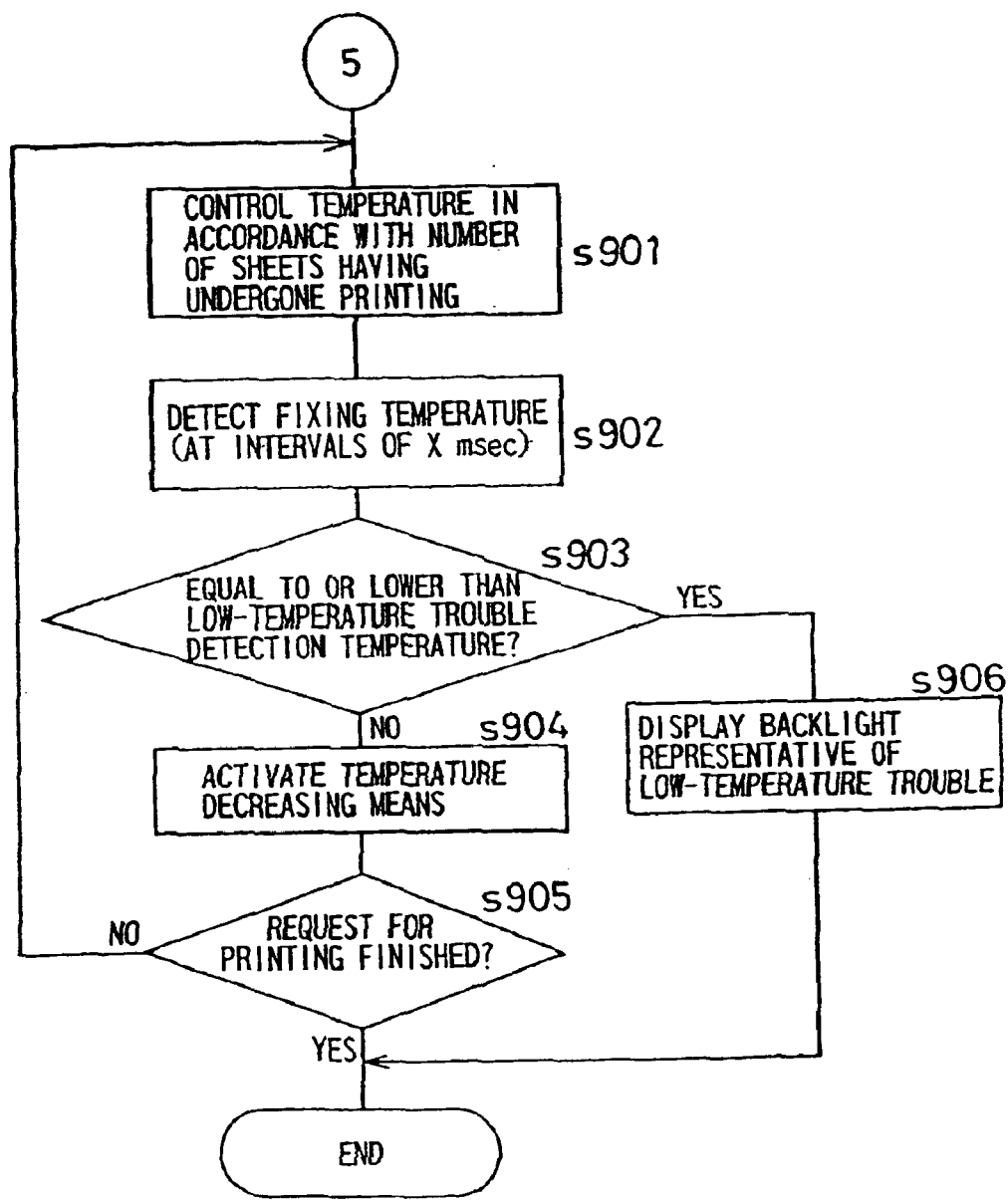
FIG. 26 is a flowchart showing a processing procedure of a printing mode in the sixth embodiment.
Figure 28:
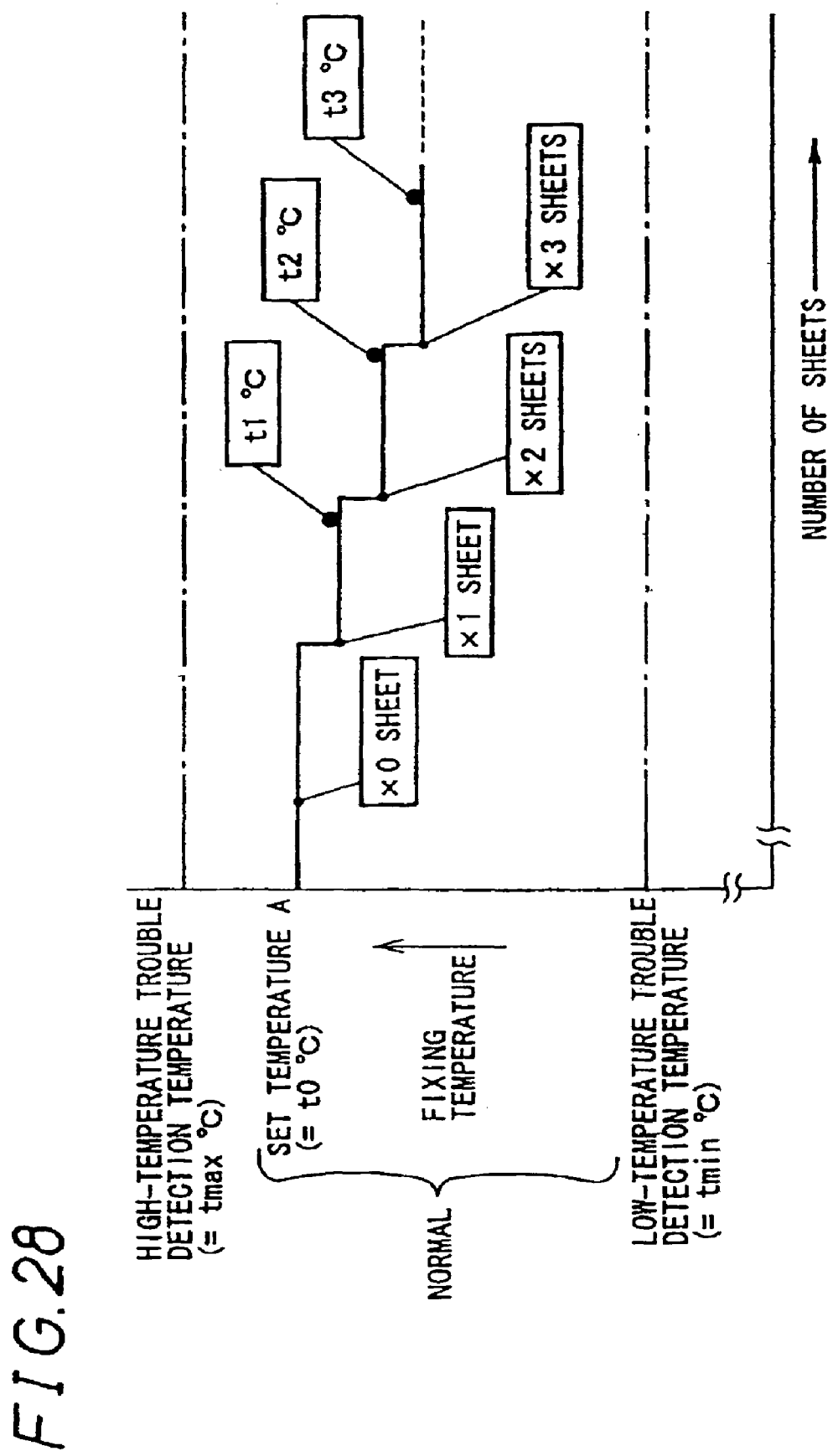
FIG. 28 is a graph on a temperature control performed by fixing means during printing in the sixth embodiment.

Next, a printing processing performed when a request for printing is accepted in the standby state as described above and the change of the back light of the LCD display portion 8 will be described with reference to the flowchart of FIG. 26. First, at step s901, a temperature control to decrease the temperature of the fixing means 23 in accordance with the number of sheets having undergone printing as shown in FIG. 28. At step s902, the fixing temperature is detected at predetermined time intervals (for example, X msec) by the temperature sensor S1 disposed in the fixing means 23.

Based on the detected temperature, at step s903, whether or not the detected temperature is equal to or lower than the low-temperature trouble detection temperature is determined. When a low-temperature trouble occurs, at step s906, the back light BL representative of an occurrence of a low-temperature trouble is displayed (see the example of the display provided when a low-temperature trouble occurs shown in FIG. 29), and the apparatus is stopped.

When the detected temperature is not equal to or lower than the low-temperature trouble detection temperature, at step s904, the back light (fixing light element L1) of a temperature range corresponding to the detected temperature, that is, a temperature range corresponding, for example, to panelF and panelC shown in FIG. 29 is displayed. After the back light is displayed, this processing is repeated until the request for printing ends (step s905).

As described above, by displaying the temperature condition of each temperature setting requiring portion of the apparatus on the back light (the fixing light element L1, etc.) of the LCD display portion 8 of the operation panel 6, the user can visually and intuitively grasp the printing condition, an occurrence of a temperature trouble and the like with accuracy without touching the apparatus or reading characters, and can promptly handle the abnormality that occurs. Consequently, safety improves, and maintenance and inspection can be automatically performed without the rate of operation of the apparatus being deteriorated, so that the life of the apparatus is prolonged.

This control by the display condition control portion 101 is applicable not only to the fixing means 23 but also to at least temperature setting requiring portions having heat sources and require temperature setting, for example, the process means (image forming portion) 200 and the scanner optical system (optical means) 10. Description thereof will not be given.

In this embodiment, an example is described where the back light (BL, L1, L2, L3, etc.) of the LCD display portion 8 is changed by the display condition control portion 101. However, the invention is not limited thereto. It is necessary only that at least the display condition of the display device is changed to appeal to vision so that attention is intuitively attracted. This display condition changes include various changes such as a change from a lit-up display to a flashing display, a change from a stationary display to a motion display (moving display), and a change from a plain display to a patterned display and vice versa.

Further, the invention is not limited to the above-described small-size digital copier but is applicable to any image forming apparatus that has at least a display panel of an operation portion for displaying the working condition and the operation condition of the apparatus and inputting conditions and a temperature setting requiring portion having a heat source and requiring temperature setting. For example, the invention is applicable to various kinds of printers, facsimile apparatuses and display devices of other kinds of compound image forming apparatuses and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus, having a plurality of processing modes, the apparatus comprising:
    a display portion for displaying a condition of the apparatus; and
    a display condition control portion for changing, when the condition changes, a display condition of the display portion to a visually easy-to-recognize condition,
    wherein the visually easy-to-recognize condition is unique to the changed condition of the apparatus and wherein said visually easy-to-recognize condition corresponds to a change of back light emitted from a back light element provided in said display portion
    wherein back light of the display portion includes a reference color, and a processing mode selected from among the plurality of processing modes is indicated by the reference color; and
    wherein, when a trouble occurs, a hue of the back light remains the same regardless of the current processing mode and processing status.

2. The image forming apparatus of claim 1, being constructed as a complex image forming apparatus, the image forming apparatus comprising at least any one of:
    original reading means for reading image information from an original;
    image receiving means for receiving image information from a terminal connected to a network; and
    line image receiving means for receiving image information from a telephone line; and
    further comprising:
    image forming means for printing the image information obtained from at least one of the original reading means, the image receiving means, and the line image receiving means.

3. The image forming apparatus of claim 1, wherein the back light element of the display portion for emitting back light is realized by a plurality of single color light emitting diodes of specific colors in combination or a color light emitting diode for emitting light of a plurality of colors, so that the display portion is capable of multiple color displays.

4. The image forming apparatus of claim 1, wherein the back light element of the display portion for emitting back light is realized by a plurality of single color electroluminescent elements of specific colors in combination or a color electroluminescent element for emitting light of a plurality of colors, so that the display portion is capable of multiple color displays.

5. The image forming apparatus of claim 1, wherein characters to be displayed on the display portion are varied in accordance with information obtained by the change of the condition.

6. The image forming apparatus of claim 5, wherein a color of characters displayed on the display portion is changed to a different color with the change of back light color, and the different color is a complementary color of the color of the back light.

7. The image forming apparatus of claim 5, wherein, when a back light color is visually a bright color, the characters are displayed in black on the display portion.

8. The image forming apparatus of claim 5, wherein, when a back light color is visually a dark color, the characters are displayed as outline characters on the display portion.

9. The image forming apparatus of claim 1, wherein the change of the back light corresponds to a change of a plurality of colors and the back light color of the display portion is varied in accordance with the change of the condition.

10. The image forming apparatus of claim 1, wherein the change of the back light corresponds to a plurality of colors and the back light color of the display portion as well as characters to be displayed on the display portion are varied in accordance with the change of the condition.

11. The image forming apparatus of claim 1, wherein a hue of the back light represents a processing status of the apparatus observed in the selected processing mode, and a change of the processing status is indicated by a change of the hue.

12. The image forming apparatus of claim 1, wherein, when a trouble occurs, a hue of the back light is changed to a different hue in accordance with the current processing mode or processing status.

13. The image forming apparatus of claim 1, wherein, when a problem occurs, a color of the back light and displayed characters are changed in accordance with the contents of the trouble.

14. The image forming apparatus of claim 1, wherein, in response to the change of the condition of the apparatus, a plurality of display modes can be selectively applied to the display portion.

15. The image forming apparatus of claim 14, wherein a plurality of display modes correspond to a variation of display form displayed on the display portion and a variation of display area.

16. The image forming apparatus of claim 14, wherein a plurality of display modes correspond to a variation of brightness of back light in the display portion.

17. The image forming apparatus of claim 14, wherein a plurality of display modes correspond to a dynamic change of a hue of back light in the display portion.

18. The image forming apparatus of claim 14, wherein a plurality of display modes are realized by a combination of variations of display form displayed on the display portion and display area, a variation of brightness of back light in the display portion, and a dynamic change of a hue of back light in the display portion.

19. The image forming apparatus of claim 14, wherein a display region of back light of the display portion is divided into a plurality of portions on the display portion so that working conditions of individual constituent parts of the apparatus are separately displayed.

20. The image forming apparatus of claim 1, having a plurality of processing modes, wherein the display portion performs color display by back light based on a change of a processing mode of the image forming apparatus, and whether the image forming apparatus is under service conditions or not can be visually checked by a change of brightness of the back light.

21. The image forming apparatus of claim 20, wherein the display condition control portion is provided with a plurality of background color light emitting circuits, and the brightness of the back light varies to correspond to the processing mode of the image forming apparatus in use.

22. The image forming apparatus of claim 20, wherein the change of the processing mode is indicated by changing the back light brightness in accordance with an input from an operation portion of the image forming apparatus or a printing request from individual terminals connected to the image forming apparatus.

23. The image forming apparatus of claim 2, having a plurality of processing modes, wherein when the display portion is arranged according to a processing mode of the image forming apparatus, a hue of back light varies to correspond to the processing mode, and the hue of the back light also varies to correspond to a processing status.

24. The image forming apparatus of claim 23, wherein back light colors which are mutually largely different in Lab level are employed to easily identify respective processing modes by a difference among back light colors.

25. The image forming apparatus of claim 23, wherein back light color is varied within approximately the same kind of color Lab level in accordance with contents of processing.

26. The image forming apparatus of claim 23, wherein, in each processing mode, at the time when a trouble occurs or when a supply needs replacing, to provide a warning, back light color is made uniform regardless of the processing mode.

27. The image forming apparatus of claim 23, wherein, in each processing mode, during one processing mode is in operation, the back light element corresponding to the other processing mode is turned off.

28. The image forming apparatus of claim 23, wherein, in each processing mode, during one processing mode is in operation, a back light element with a hue representative of another reservable or interruptible processing mode is turned on.

29. The image forming apparatus of claim 1, wherein the display condition of the display portion is visually varied and contents of display are changed in accordance with a progress of processing.

30. The image forming apparatus of claim 29, wherein a change of the display contents of the display portion is made by changing characters to be displayed on the display portion based on information obtained from the change of the condition of the image forming apparatus.

31. The image forming apparatus of claim 29, wherein a color of characters to be displayed on the display portion is changed to a different color with the change of back light color, and the different color is a complementary color of the color of the back light.

32. The image forming apparatus of claim 29, wherein, when back light color is visually a bright color, characters are displayed in black on the display portion.

33. The image forming apparatus of claim 30, wherein, when back light color is visually a dark color, characters are displayed are displayed as outline characters on the display portion.

34. The image forming apparatus of claim 30, wherein a plurality of colors of back light of the display portion are selected by controlling a voltage applied to electrodes of liquid crystal cells constituting a liquid crystal display element of the display portion in accordance with a change of working status.

35. The image forming apparatus of claim 30, wherein the characters displayed on the display portion is varied by controlling a voltage applied to electrodes of liquid crystal cells constituting a liquid crystal display element of the display portion in accordance with a change of working status.

36. The image forming apparatus of claim 30, wherein a plurality of colors of back light of the display portion are selected by controlling a voltage applied to electrodes of liquid crystal cells constituting a liquid crystal display element of the display portion in accordance with a change of working status, and wherein the characters to be displayed on the display portion is varied by controlling the voltage applied to the electrodes of the liquid crystal cells constituting the liquid crystal display element of the display portion in accordance with the change of the working status.

37. The image forming apparatus of claim 36, wherein the plurality of colors of the back light includes a reference color, and, in accordance with the reference color, the progress of the processing in a selected processing mode is indicated by the back light.

38. The image forming apparatus of claim 1, wherein the display portion is capable of displaying other information than inputting conditions for the apparatus in question.

39. The image forming apparatus of claim 1, wherein, when the image forming apparatus is out of service and is in the standby state with its power source turned on, the back light element is turned off.

40. The image forming apparatus of claim 1, wherein, when the image forming apparatus is deactivated, or when no user is found around the apparatus, the back light element is turned off.

41. The image forming apparatus of claim 1, wherein the back light element is turned on after the approach of users is detected by a reflection-type sensor arranged in an exterior portion of the image forming apparatus.

42. The image forming apparatus of claim 1, having a FAX mode, wherein in the FAX mode, when a job for data reception is finished, the back light element is turned on to provide a warning that received data is present.

43. The image forming apparatus of claim 1, having a printer mode, wherein, in the printer mode, when a job for a print request is finished, the back light element is turned on to provide notification that the job is completed.

* * * * *